United States Patent
Chen et al.

(10) Patent No.: US 7,687,612 B1
(45) Date of Patent: Mar. 30, 2010

(54) REACTIVE DYESTUFF WITH DIALKYLETHER BRIDGE GROUP

(75) Inventors: Chien-Yu Chen, Taoyuan Hsien (TW); Chen-Lung Kao, Taoyuan Hsien (TW); Wen-Jang Chen, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 12/382,087

(22) Filed: Mar. 9, 2009

(30) Foreign Application Priority Data

Nov. 4, 2008 (CN) .................. 2008 1 0169189

(51) Int. Cl.
*C09B 62/513* (2006.01)
*C09B 62/515* (2006.01)

(52) U.S. Cl. ............................................. 534/642

(58) Field of Classification Search .............. None
See application file for complete search history.

(56) References Cited

U.S. PATENT DOCUMENTS

| | | | |
|---|---|---|---|
| 5,149,366 A * | 9/1992 | Kawashita et al. ....... | 106/31.52 |
| 5,434,251 A * | 7/1995 | Herd ........................ | 534/566 |
| 5,493,010 A * | 2/1996 | Herd et al. ............... | 534/642 |

* cited by examiner

*Primary Examiner*—Fiona T Powers
(74) *Attorney, Agent, or Firm*—Bacon & Thomas, PLLC

(57) ABSTRACT

The present invention relates to a novel reactive dyestuff with dialkylether bridge group, represented by the following formula (I):

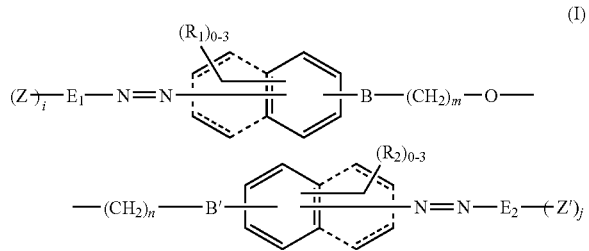

wherein B, B', $E_1$, $E_2$, Z, Z', i, j, $(R_1)_{0-3}$, $(R_2)_{0-3}$, m and n are defined the same as the specification. The reactive dyestuff of the present invention is suitable for exhaust dyeing, cold batch-up dyeing, continuous dyeing, printing and digital spray printing materials that contain hydroxyl group or amino group fibers.

20 Claims, No Drawings

REACTIVE DYESTUFF WITH DIALKYLETHER BRIDGE GROUP

BACKGROUND OF THE INVENTION

1. Field of the Invention

The present invention relates to a novel reactive dyestuff, more particularly, to a novel reactive dyestuff that is suitable for exhaust dyeing, cold batch-up dyeing, continuous dyeing, printing and digital spray printing materials that contain hydroxyl group or polyamine fibers.

2. Description of Related Art

An azo dyestuff, where the chromophore thereof is composed of azo components and coupling components, can be widely employed and used as a reactive dyestuff for heavy color dyeing, such as red, navy, blue, black and so on, owing to its board color gamut and high extinction coefficient. Among azo dyestuffs, a navy reactive dyestuff with sulphato-ethyl-sulphone (SES) groups produced in 1957 by Hoechst in Germany, C.I. Reactive Black 5, is the most well-known. C.I. Reactive Black 5 can be used to dye fabrics intensely heavy shade and its structure is represented by the following formula (A).

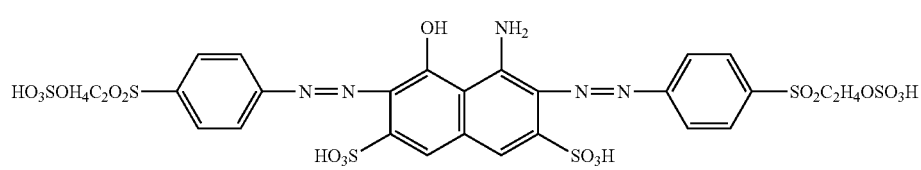

(A)

The reactive dyestuff has been applied in the dyestuff industry for many years. Currently, the development of reactive dyestuffs moves towards higher fixation and better build up to meet the economic demands. Over the years, many researches focus on the development of dyestuffs that show better build up to meet the economic demands in comparison to C.I. Reactive Black 5. For example, in 1980, Hoyer et al. in Hoechst disclosed a tetraazo structure with a sulfonyl bridge group in U.S. Pat. No. 4,244,258. The tetraazo structure is represented by the following formula (B).

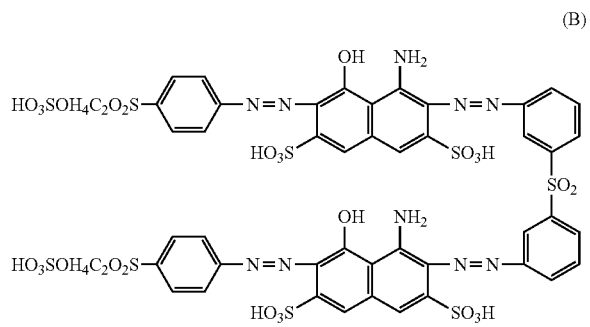

(B)

In 1997, Tzikas et al. in CIBA Geigy disclosed a tetraazo structure with an aminocarbonyl or aminosulfonyl bridge group in U.S. Pat. No. 5,629,410. The tetraazo structure is represented by the following formula (C).

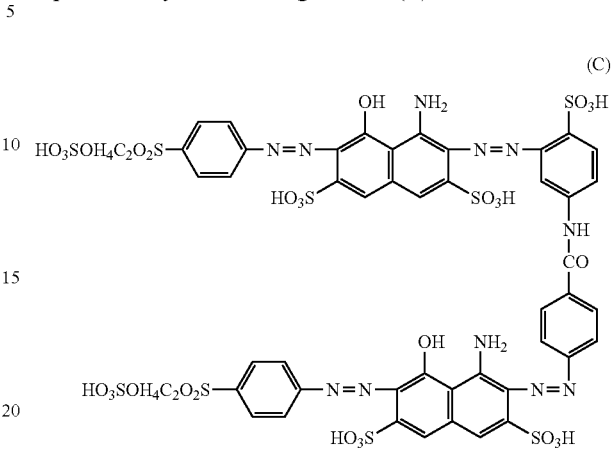

(C)

However, the build up, hue-shift, levelness and wash fastness of the aforementioned novel dyestuffs cannot meet the market requirements. Thereby, it is desirable to improve the aforementioned properties.

SUMMARY OF THE INVENTION

By various experiments, the present inventors discovered that a novel compound with a dialkylether bridge group, as shown in the following formula (D), and the method for manufacturing the same can be applied in the reactive dyestuff field to obtain a series of yellow, orange, red, navy, blue and black reactive dyestuffs, which can show high color yield, high fixation, improved fastness and stable bonding between the fibers and the dyestuffs.

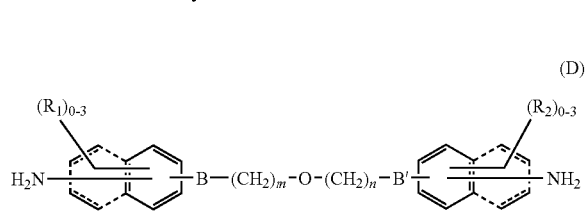

(D)

Accordingly, the present invention provides a novel reactive dyestuff with a dialkylether bridge group, which exhibits the properties of improved fixation yield, excellent build up, high wash fastness and excellent wet fastness while dyeing cellulose fibers.

A novel reactive dyestuff with a dialkylether bridge group according to the present invention is represented by the following formula (I),

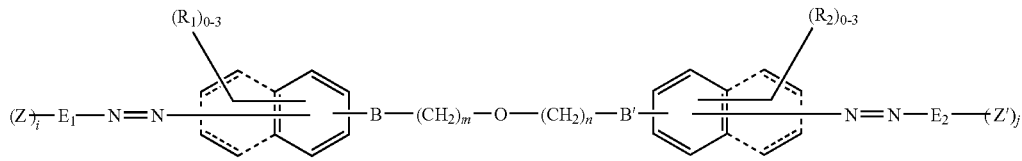

wherein, $E_1$ and $E_2$ each independently are couplers selected from the group consisting of benzene, naphthalene, pyrazolone, monoazo, disazo, polyazo and metal complex azo components;

$(R_1)_{0-3}$ and $(R_2)_{0-3}$ each independently are 0 to 3 identical or different groups, and each of $R_1$ and $R_2$ independently is selected from the group consisting of hydrogen, halogen, hydroxyl, carboxyl, sulfo, nitro, cyano, $C_{1-4}$ alkyl, $C_{1-4}$ alkoxy, ureido and amido;

B and B' each independently are selected from the group consisting of a direct bond, —$SO_2$— and —CONH—$(CH_2)_k$—$SO_2$—;

k is an integer between 1 to 6;

Z and Z' each independently are selected from the group consisting of —$SO_2$—U, —CONH—$(CH_2)_d$—$SO_2$—U, —O—$(CH_2)_r$—CONH—$(CH_2)_d$—$SO_2$—U, β-thiosulfatoethylsulfonyl and —N(R')—U';

d and r are integers independent of one another between 2 to 4;

U is —OH, —$CH_2CH_2OH$, —$CH_2CH_2W$ or —$CH=CH_2$;

W is a leaving group, —Cl, —$OSO_3H$ or —$OPO_3H$, which is eliminable by a base, a qualter salt selected from the group consisting of quaternary ammonium, pyridine, carboxypyridinium, methylpyridinium and carbonamidopyridinium, or a group of

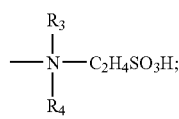

$R_3$ and $R_4$ each independently are hydrogen or $C_{1-4}$ alkyl;

U' is α,β-halopropionyl, α-haloacryloyl, β-halopropionyl or α-haloacryloyl;

R' is hydrogen or $C_{1-4}$ alkyl;

i and j are integers independent of one another between 0 to 2, and the sum of i and j is not 0; and m and n are integers independent of one another between 1 to 4.

In the reactive dyestuff of the formula (I) according to the present invention, preferably, $(R_1)_{0-3}$ and $(R_2)_{0-3}$ each independently are selected from the group consisting of hydrogen, SUM), $C_{1-4}$ alkyl and $C_{1-4}$ alkoxy.

In the reactive dyestuff of the formula (I) according to the present invention, preferably, B and B' each independently are —$SO_2$— or —CONH—$(CH_2)_k$—$SO_2$—.

In the reactive dyestuff of the formula (I) according to the present invention, preferably, Z and Z' each independently are selected from the group consisting of —$SO_2$—U, —CONH—$(CH_2)_d$—$SO_2$—U and —N(R')—U'.

In the reactive dyestuff of the formula (I) according to the present invention, $E_1$ and $E_2$ can each independently be a pyrazolone component. Preferably, $E_1$ and $E_2$ each independently are represented by the following formula (* represents a position for coupling),

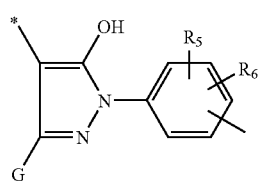

wherein, G is $C_{1-3}$ alkyl, carboxyl or $C_{2-5}$ alkylcarboxyl; and $R_5$ and $R_6$ each independently are selected from the group consisting of hydrogen, halogen, hydroxyl, carboxyl, sulfo, nitro, cyano, $C_{1-4}$ alkyl and $C_{1-4}$ alkoxy.

In the reactive dyestuff of the formula (I) according to the present invention, $E_1$ and $E_2$ can each independently be a benzene component.

Preferably, $E_1$ and $E_2$ each independently are represented by the following formula (* represents a position for coupling),

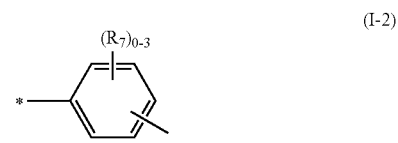

wherein, $(R_7)_{0-3}$ is 0 to 3 identical or different groups, and each of $R_7$ independently is selected from the group consisting of halogen, hydroxyl, carboxyl, sulfa, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

In the reactive dyestuff of the formula (I) according to the present invention, $E_1$ and $E_2$ can each independently be a naphthalene component. Preferably, $E_1$ and $E_2$ each independently are represented by the following formulas (* represents a position for coupling),

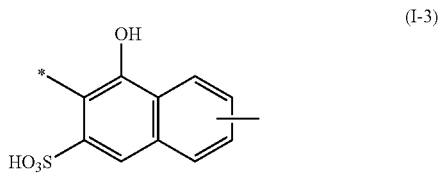

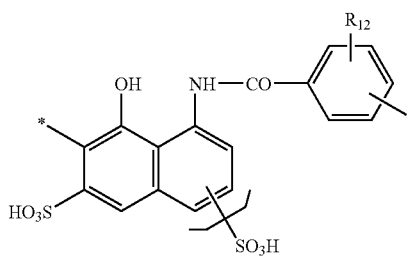

(I-4)

wherein, $R_{12}$ is selected from the group consisting of hydrogen, halogen, hydroxyl, carboxyl, sulfo, amino, nitro, cyano, acetylamino, ureido, $C_{1-4}$ alkyl and $C_{1-4}$ alkoxy.

In the reactive dyestuff of the formula (I) according to the present invention, $E_1$ and $E_2$ can each independently be a monoazo component. Preferably, $E_1$ and $E_2$ each independently are represented by the following formulas (* represents a position for coupling), (I-5)

(I-6)

(I-7)

(I-8)

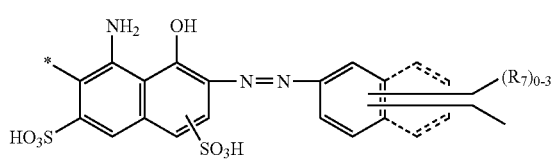

(I-9)

(I-10)

(I-11)

wherein, $(R_7)_{0-3}$ and $R_{12}$ are defined as above;

$R_8$ is hydrogen, $C_{1-4}$ alkyl, $C_{2-4}$ alkylcarboxyl or $C_{1-4}$ alkyl substituted by hydroxyl, cyano, carboxyl, sulfo, methoxycarbonyl, ethoxycarbonyl or acetoxy; and $R_{11}$ is hydrogen, $C_{1-4}$ alkyl, unsubstituted or substituted phenyl by halogen, hydroxyl, carboxyl, sulfo, nitro, $C_{1-4}$ alkyl or $C_{1-4}$ alkoxy, or $C_{1-4}$ alkyl substituted by hydroxyl, carboxyl, cyano or sulfo.

In the reactive dyestuff of the formula (I) according to the present invention, $E_1$ and $E_2$ can each independently be a disazo component.

Preferably, $E_1$ and $E_2$ each independently are represented by the following formulas (* represents a position for coupling),

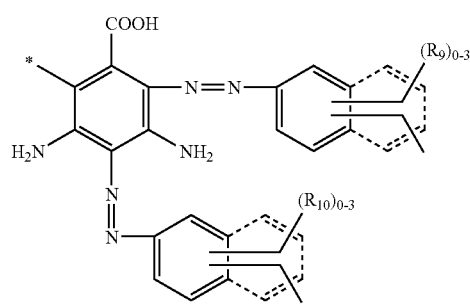

(I-12)

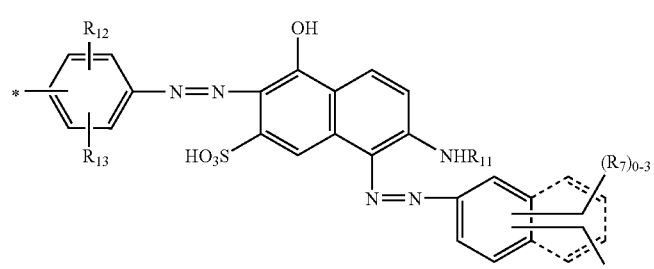

(I-13)

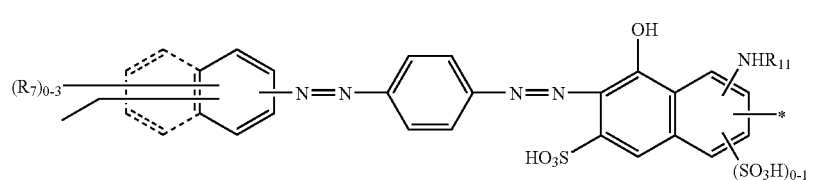

(I-14)

wherein, $(R_7)_{0-3}$, $R_{11}$ and $R_{12}$ are defined as above;

$(R_9)_{0-3}$ is 0 to 3 identical or different groups, and each of $R_9$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$(R_{10})_{0-3}$ is 0 to 3 identical or different groups, and each of $R_{10}$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl; and $R_{13}$ is selected from the group consisting of hydrogen, halogen, hydroxyl, carboxyl, sulfo, amino, nitro, cyano, acetylamino, uredio, $C_{1-4}$ alkyl and $C_{1-4}$ alkoxy.

In the reactive dyestuff of the formula (I) according to the present invention, $E_1$ and $E_2$ can each independently be a polyazo component. Preferably, $E_1$ and $E_2$ each independently are represented by the following formula (* represents a position for coupling), wherein, $(R_7)_{0-3}$ and $R_{11}$ are defined as above; and p is 2 or 3.

In the reactive dyestuff of the formula (I) according to the present invention, $E_1$ and $E_2$ can each independently be a metal complex azo component. Preferably, $E_1$ and $E_2$ each independently are represented by the following formulas (* represents a position for coupling),

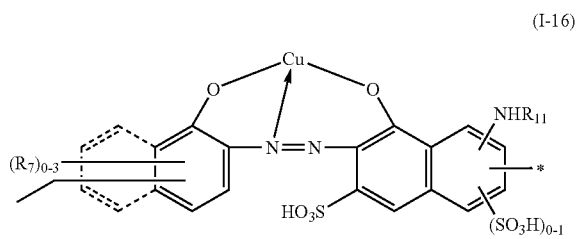

(I-16)

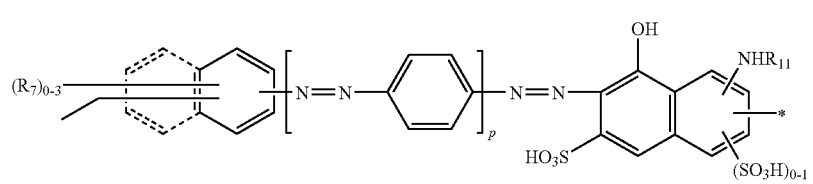

(I-15)

(I-17)

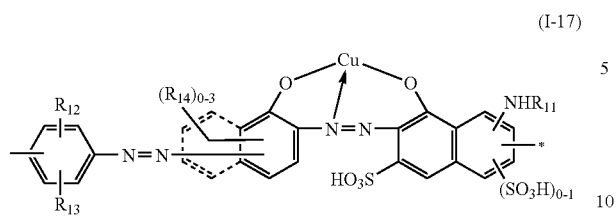

wherein, $(R_7)_{0-3}$, $R_{11}$, $R_{12}$ and $R_{13}$ are defined as above; and $(R_{14})_{0-3}$ is 0 to 3 identical or different groups, and each of $R_{14}$ independently is selected from the group consisting of halogen, hydroxyl, carboxyl, sulfo, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

In the reactive dyestuff of the formula (I) according to the present invention, $E_1$ and $E_2$ can each independently be a pyrazolone component. More preferably, $E_1$ and $E_2$ each independently are represented by the following formula (* represents a position for coupling), (II-1)

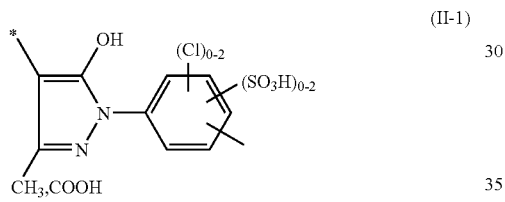

In the reactive dyestuff of the formula (I) according to the present invention, $E_1$ and $E_2$ can each independently be naphthalene component. More preferably, $E_1$ and $E_2$ each independently are represented by the following formula (* represents a position for coupling), (II-2)

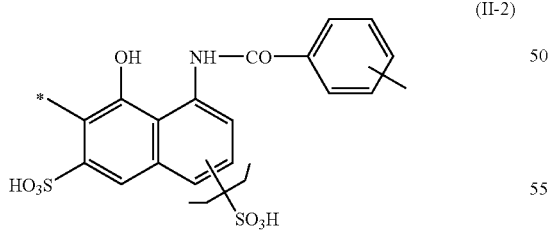

In the reactive dyestuff of the formula (I) according to the present invention, $E_1$ and $E_2$ can each independently be a monoazo component. More preferably, $E_1$ and $E_2$ each independently are represented by the following formulas (* represents a position for coupling), (II-3)

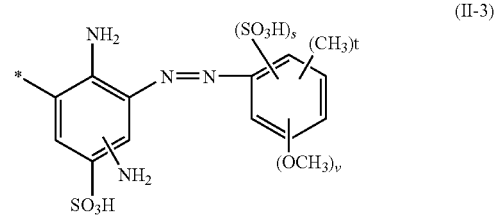

(II-4)

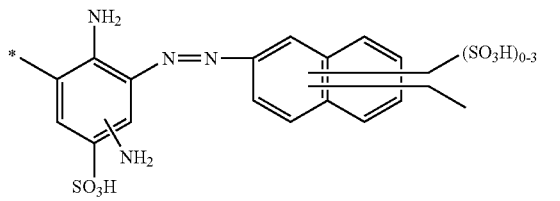

(II-5)

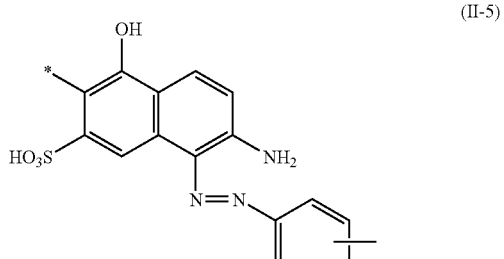

(II-6)

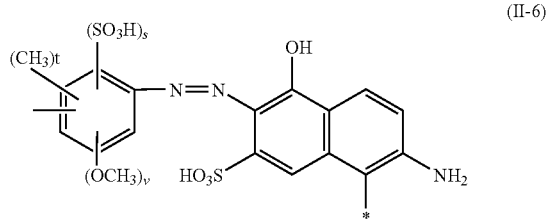

(II-7)

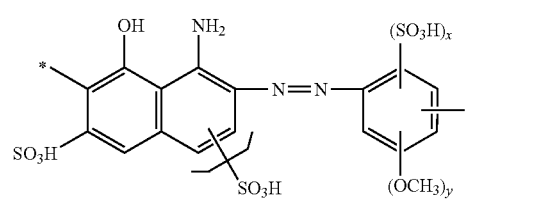

(II-8)

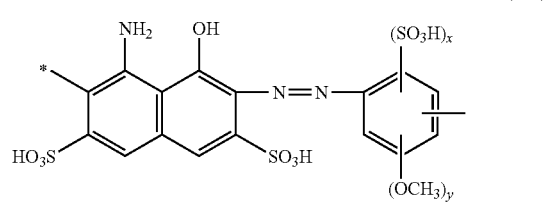

(II-9)

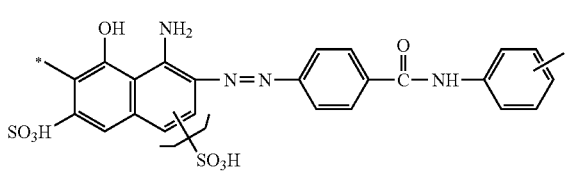

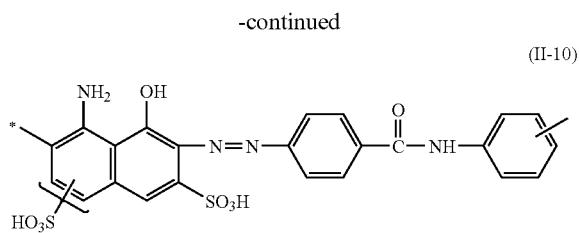
(II-10)

wherein, s, t and v are integers independent of one another between 0 to 2, and s+t+v is an integer between 0 to 3; and x and y are integers independent of one another between 0 to 2, and x+y is an integer between 0 to 3.

In the reactive dyestuff of the formula (I) according to the present invention, $E_1$ and $E_2$ can each independently be a disazo component. More preferably, $E_1$ and $E_2$ each independently are represented by the following formulas (* represents a position for coupling),

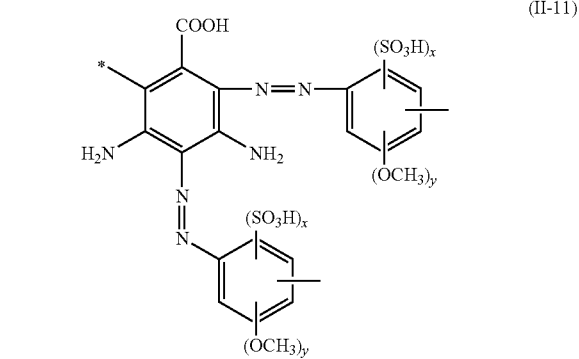
(II-11)

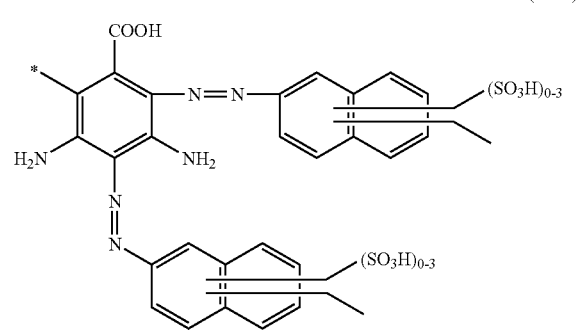
(II-12)

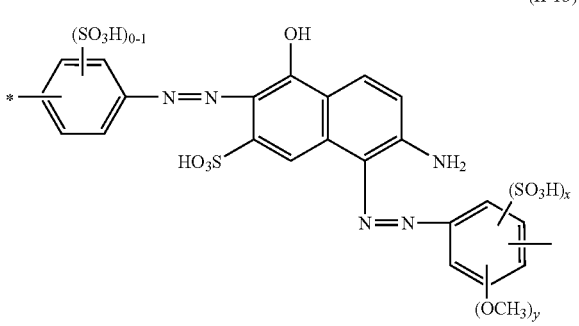
(II-13)

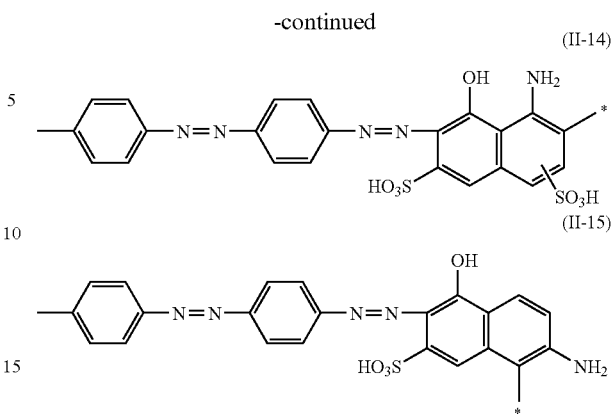
(II-14)

(II-15)

wherein, x and y are defined as above.

In the reactive dyestuff of the formula (I) according to the present invention, $E_1$ and $E_2$ can each independently be a metal complex azo component. More preferably, $E_1$ and $E_2$ each independently are represented by the following formula (* represents a position for coupling),

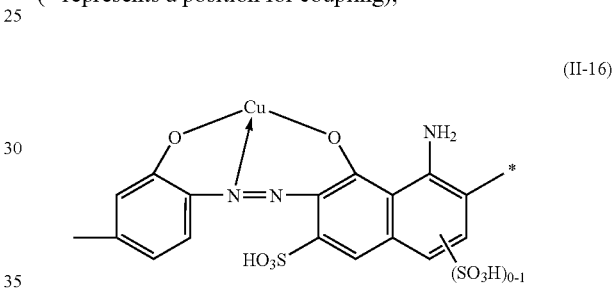
(II-16)

For describing conveniently, the compound is expressed as free acid in the specification. When produced or used, the dyestuffs of the present invention are often presented as water-soluble salts. The salts suitable for the present invention may be the alkaline metal salts, alkaline earth metal salts, ammonium salts or organic amine salts; preferably, the salts are sodium salts, potassium salts, lithium salts, ammonium salts or triethanolamine salts.

With regard to the synthesis of the dyestuffs according to the present invention, the ether bridge group can be first synthesized or the conjunction between two identical compounds obtained from the first coupling reaction can be performed to further obtain the desired dyestuffs.

Also, the dyestuffs according to the present invention can be prepared by a conventional method. The synthetic routine for preparing the dyestuffs is not strictly limited. For example, a chromophore may be first prepared and then a desired dyestuff is synthesized, or a chromophore may be synthesized in the process for preparing a dyestuff.

The dyestuffs of the present invention can be applied to dye and print on many kinds of fiber materials, particularly cellulose fiber materials and cellulose-included fiber materials. The examples of the fiber materials are not limited. It can be natural or regenerated cellulose fibers, such as cotton, hemp, linen, jute, ramie, mucilage rayon, as well as cellulose-included fiber materials. The dyestuffs of the present invention can also be applied to dye and print fiber blended fabrics containing hydroxyl groups.

The dyestuffs of the present invention can be applied to the fiber material and fixed on the fiber in various ways, in particularly in the form of aqueous dyestuff solutions and printing pastes. They can be applied to dye and print on cellulose fibers by exhaustion dyeing, continuous dyeing, cold-pad-batch dyeing, printing or digital printing.

The dyeing or printing of the present invention can be proceeded by the conventional and usually known method. For example, exhaustion dyeing is applied by using separately or mixing the well-known inorganic salts (e.g. sodium sulfate and sodium chloride) and acid-binding agents (e.g. sodium carbonate, sodium hydroxide). The amount of inorganic salts and alkali does not matter. The inorganic salts and alkali can be added either once or several times into the dyeing bath through traditional methods. In addition, dyeing assistant agents (such as leveling agent, suspending agent and so on) can be added according to conventional method. The range of dyeing temperature is from 40° C. to 90° C. Preferably, the temperature for dyeing is from 50° C. to 70° C.

In the cold-pad-batch dyeing method, the material is padded by using the well-known inorganic salts (e.g. sodium sulfate and sodium chloride) and acid-binding agents (e.g. sodium carbonate, sodium hydroxide). The padded fabric is rolled and stored at room temperature to allow dye fixation to take place.

In the continuous dyeing method, two different methods exist. In the one-bath pad dyeing method, the material is padded according to the conventional method in the mixture of the well-known acid-binding agents (e.g. sodium carbonate or sodium bicarbonate) and the pad liquid. The resultant material is then dried and color fixed by baking or steaming.

In the two-bath pad dyeing method, the material is padded with a dye liquid and then dealt by a known inorganic neutral salt (e.g., sodium sulfate or sodium silicate). The dealt material is preferably dried and color fixed by baking or steaming as usual.

In the textile printing method, such as single printing method, the material is printed by printing paste containing the known acid-binding agent (e.g., sodium bicarbonate) and is dried and color fixed by baking or steaming.

In the two-phase printing method, the material is dipped in a solution containing inorganic neutral salt (e.g., sodium chloride) and the known acid-binding agent (e.g., sodium hydroxide or sodium carbonate) in a high temperature of 90° C. or above to fix the color.

The dyeing or printing methods employed in the process of the present invention are not limited to the above methods.

Other objects, advantages, and novel features of the invention will become more apparent from the following detailed description when taken in conjunction with the accompanying drawings.

BRIEF DESCRIPTION OF THE DRAWINGS none

DETAILED DESCRIPTION OF THE PREFERRED EMBODIMENT

For convenience in the statement, the following examples are exemplified for a more concrete description. Many examples have been used to illustrate the present invention. The examples sited below should not be taken as a limit to the scope of the invention. The compounds are represented in the form of free acid. However, in practice, they often exist as metallic salts, and most likely alkaline metallic salts, particularly sodium salts. Unless otherwise stated, the parts and percentage used in the following examples are based on weight, and the temperature is in Celsius degree (° C.).

Example 1

28.1 parts of 4-(β-sulfatoethylsulfone) aniline and 25.6 parts of 32% HCl (aq) are added into 300 parts of 0° C. water with thorough stirring to form a dispersion solution, followed by the addition of 7.2 parts of sodium nitrite. The temperature of the solution is controlled in a range of 0° C. to 5° C. until the diazotization is accomplished. Subsequently, 31.9 parts of 4-amino-5-hydroxy-2,7-naphthalenedisulfonic acid powder are added therein, and the pH value of the reaction solution is adjusted to 3 by the addition of 10 parts of $NaHCO_3$. The reaction solution is stirred until the coupling reaction is accomplished. Next, the pH value of the reaction solution is adjusted to be larger than 12 by the addition of 45% NaOH (aq) and the temperature thereof is controlled in a range of 5° C. to 10° C. to perform reaction for 20 hours. A red aqueous solution ($\lambda_{max}$=550 nm) is obtained, and the structure of the product is shown in the following formula (1),

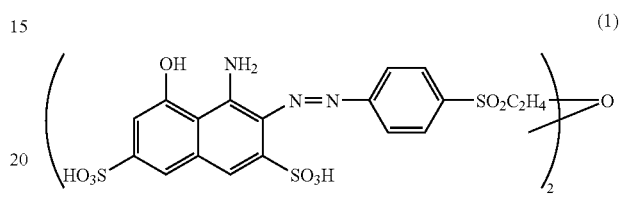

(1)

Example 2

28.1 parts of 4-(β-sulfatoethylsulfone) aniline and 25.6 parts of 32% HCl (aq) are added into 300 parts of 0° C. water with thorough stirring to form a dispersion solution, followed by the addition of 7.2 parts of sodium nitrite. The temperature of the solution is controlled in a range of 0° C. to 5° C. until the diazotization is accomplished. Subsequently, 31.9 parts of 4-amino-5-hydroxy-1,7-naphthalenedisulfonic acid powder are added therein, and the pH value of the reaction solution is adjusted to 3 by the addition of 10 parts of $NaHCO_3$. The reaction solution is stirred until the coupling reaction is accomplished. Next, the pH value of the reaction solution is adjusted to be larger than 12 by the addition of 45% NaOH (aq) and the temperature thereof is controlled in a range of 5° C. to 10° C. to perform reaction for 20 hours. The obtained product is shown in the following formula (2).

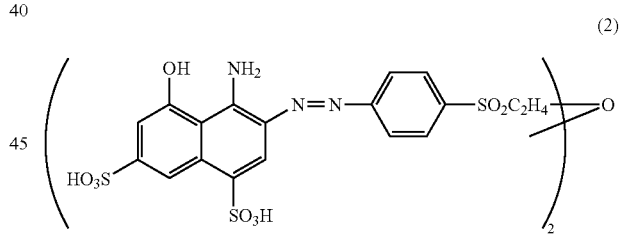

(2)

Example 3

36.1 parts of 1-aminobenzene-4-(3-sulfatoethylsulfone)-2-sulfonic acid and 30 parts of 32% HCl (aq) are added into 150 parts of 0° C. water with thorough stirring to form a dispersion solution, followed by the addition of 7.2 parts of sodium nitrite. The temperature of the solution is controlled in a range of 0° C. to 5° C. until the diazotization is accomplished. Subsequently, 23.9 parts of 2-Amino-5-hydroxy naphthalene-7-sulfonic acid powder are added therein, and the pH value of the reaction solution is adjusted to 5 by the addition of 12 parts of $NaHCO_3$. The reaction solution is stirred until the coupling reaction is accomplished. Next, the pH value of the reaction solution is adjusted to be larger than 12 by the addition of 45% NaOH (aq) and the temperature thereof is controlled in a range of 5° C. to 10° C. to perform reaction for 20 hours. The obtained product is shown in the following formula (3).

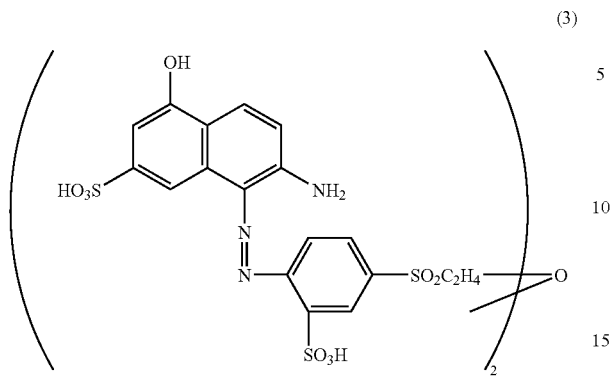
(3)
Examples 4 to 9
According to the synthetic methods of Examples 1-3, the compounds (4)-(9) can be obtained, as shown in Table 1.
TABLE 1
Structure
(Example/Formula)
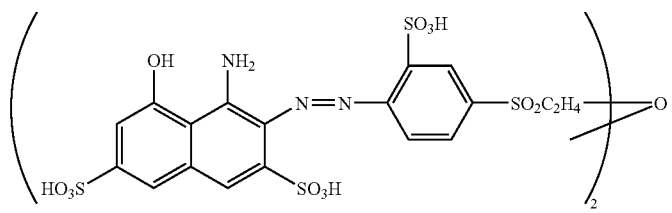
(4)
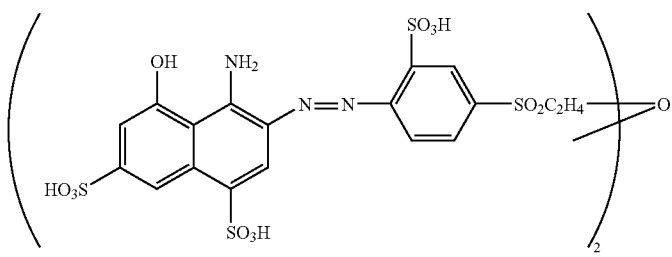
(5)

TABLE 1-continued
Structure
(Example/Formula)
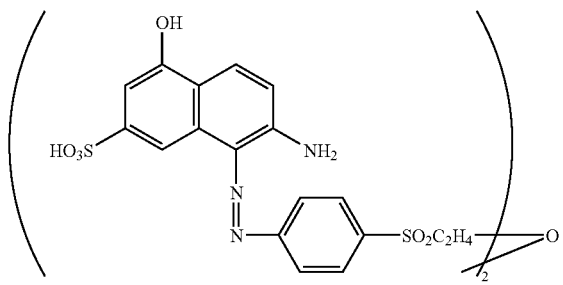
(6)
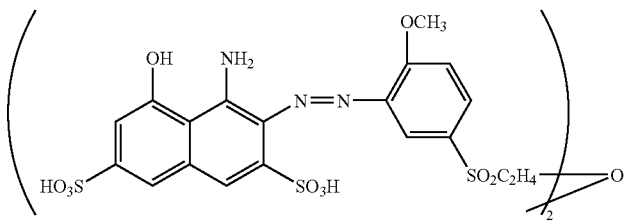
(7)
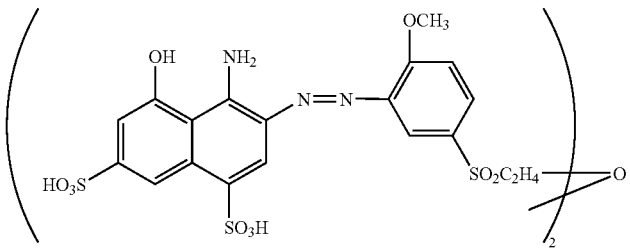
(8)
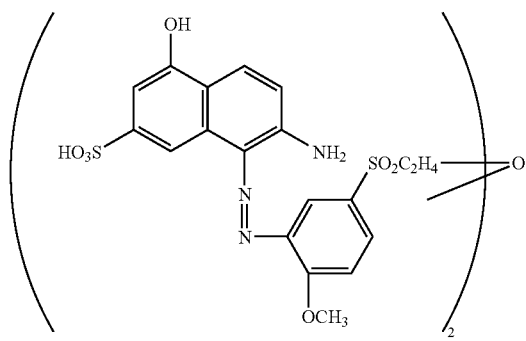
(9)

Example 10

28.1 parts of 4-(3-sulfatoethylsulfone) aniline and 25.6 parts of 32% HCl (aq) are added into 300 parts of 0° C. water with thorough stirring to form a dispersion solution, followed by the addition of 7.2 parts of sodium nitrite. The temperature of the solution is controlled in a range of 0° C. to 5° C. until the diazotization is accomplished. Subsequently, an aqueous solution containing 52.2 parts of the compound (1) is added therein, and the pH value of the reaction solution is adjusted to 5.5 by the addition of NaHCO$_3$. The reaction solution is stirred until the coupling reaction is accomplished. The navy product is obtained, as shown in the following formula (10).

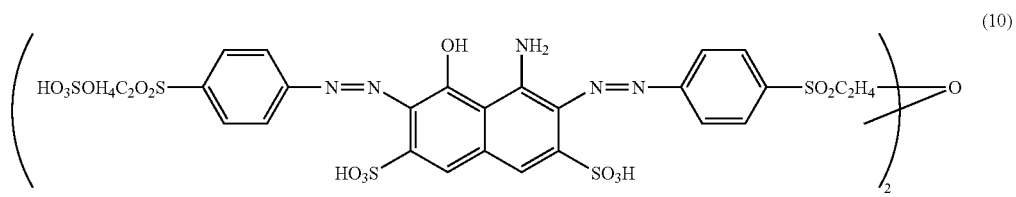

(10)

Example 11

28.1 parts of 4-(β-sulfatoethylsulfone) aniline and 25.6 parts of 32% HCl (aq) are added into 300 parts of 0° C. water with thorough stirring to form a dispersion solution, followed by the addition of 7.2 parts of sodium nitrite. The temperature of the solution is controlled in a range of 0° C. to 5° C. until the diazotization is accomplished. Subsequently, an aqueous solution containing 52.2 parts of the compound (2) is added therein, and the pH value of the reaction solution is adjusted to 5.5 by the addition of NaHCO$_3$. The reaction solution is stirred until the coupling reaction is accomplished. The navy product is obtained, as shown in the following formula (11).

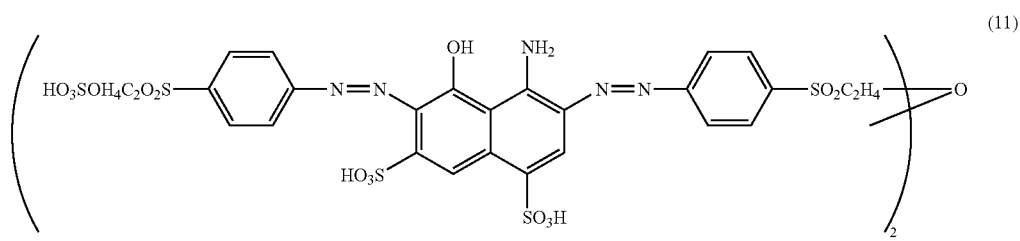

(11)

Example 12

32.5 parts of 2-methoxy-4-(β-sulfatoethylsulfone)-5-methyl aniline and 25.6 parts of 32% HCl (aq) are added into 300 parts of 0° C. water with thorough stirring to form a dispersion solution, followed by the addition of 7.2 parts of sodium nitrite. The temperature of the solution is controlled in a range of 0° C. to 5° C. until the diazotization is accomplished. Subsequently, an aqueous solution containing 52.2 parts of the compound (3) is added therein, and the pH value of the reaction solution is adjusted to 5.5 by the addition of NaHCO$_3$. The reaction solution is stirred until the coupling reaction is accomplished. The red product is obtained, as shown in the following formula (12),

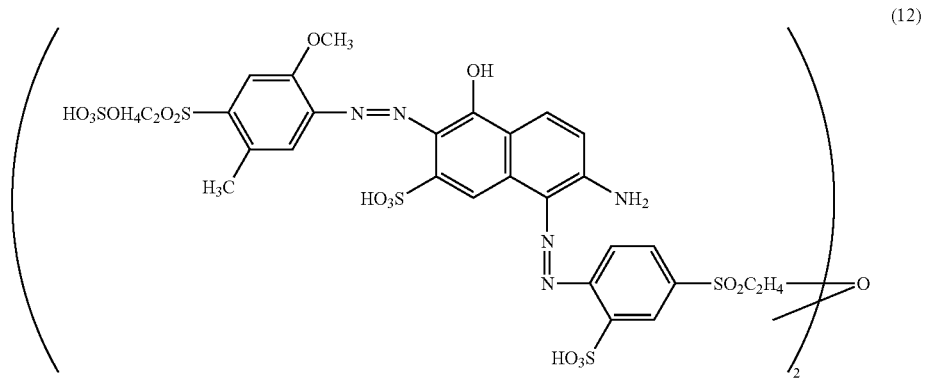

(12)

Example 13

36.1 parts of 1-aminobenzene-4-(β-sulfatoethylsulfone)-2-sulfonic acid and 30 parts of 32% HCl (aq) are added into 150 parts of 0° C. water with thorough stirring to form a dispersion solution, followed by the addition of 7.2 parts of sodium nitrite. The temperature of the solution is controlled in a range of 0° C. to 5° C. until the diazotization is accomplished. Subsequently, an aqueous solution containing 52.2 parts of the compound (3) is added therein, and the pH value of the reaction solution is adjusted to 5.5 by the addition of $NaHCO_3$. The reaction solution is stirred until the coupling reaction is accomplished. The red product is obtained, as shown in the following formula (13).

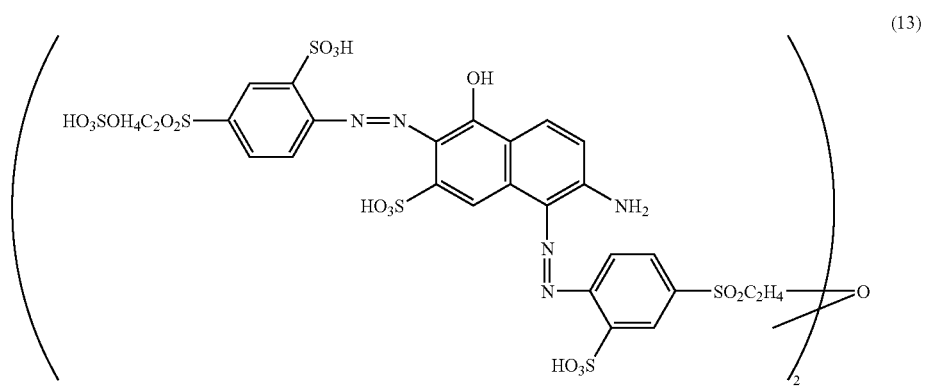

(13)

Examples 14 to 36

According to the synthetic methods of Examples 10 to 13, the compounds (14)-(36) can be obtained, as shown in Table 2.

TABLE 2
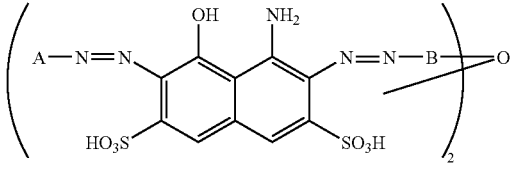
| Example/Formula | A | (—N=N)—B—(O—) |
|---|---|---|
| 14 | 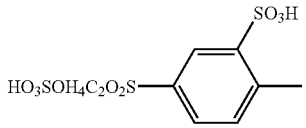 | 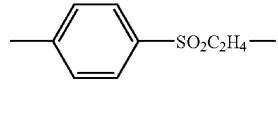 |
| 15 | 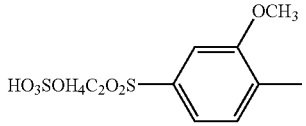 | 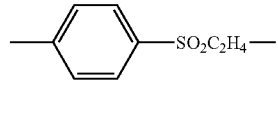 |
| 16 | 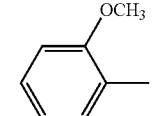 | 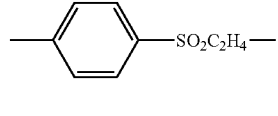 |
| 17 | 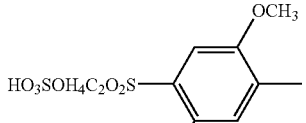 | 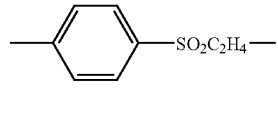 |
| 18 | 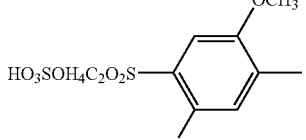 | 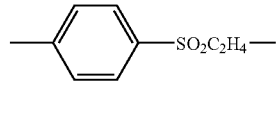 |
| 19 | 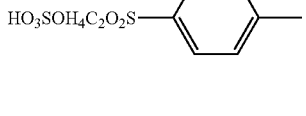 | 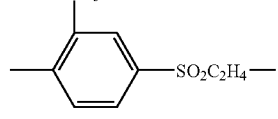 |
| 20 | 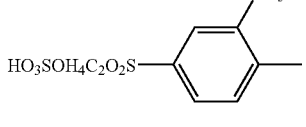 | 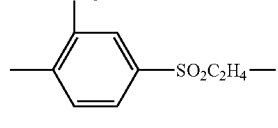 |
| 21 | 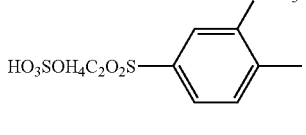 | 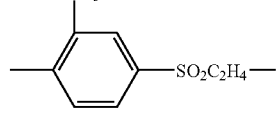 |

TABLE 2-continued
| Example/Formula | A | (—N=N)—B—(O—) |
|---|---|---|
| 22 |  | 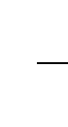 |
| 23 |  |  |
| 24 |  |  |
| 25 |  | 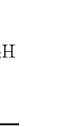 |
| 26 | 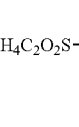 | 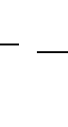 |
| 27 | 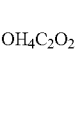 | 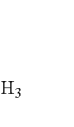 |
| 28 |  |  |
| 29 | | |

TABLE 2-continued

Structure: bis-azo naphthalene with OH, NH₂, two SO₃H groups, linked as (A—N=N—)...(—N=N—B—O—)₂

| Example/Formula | A | (—N=N)—B—(O—) |
|---|---|---|
| 30 | 2-methoxy-5-methyl-4-(HO₃SOH₄C₂O₂S)-phenyl | 2-methoxy-4-methyl-5-(SO₂C₂H₄—)-phenyl (OCH₃, SO₂C₂H₄—) |
| 31 | 4-(HO₃SOH₄C₂O₂S)-phenyl | 4-methoxy-3-methyl-(SO₂C₂H₄—)-phenyl |
| 32 | 4-methyl-3-sulfo-(HO₃SOH₄C₂O₂S)-phenyl | 4-methoxy-3-(SO₂C₂H₄—)-phenyl |
| 33 | 3-methoxy-4-methyl-(HO₃SOH₄C₂O₂S)-phenyl | 4-methoxy-3-(SO₂C₂H₄—)-phenyl |
| 34 | 4-methoxy-3-methyl-(HO₃SOH₄C₂O₂S)-phenyl | 4-methoxy-3-(SO₂C₂H₄—)-phenyl |
| 35 | 2,5-dimethoxy-4-(HO₃SOH₄C₂O₂S)-phenyl | 4-methoxy-3-(SO₂C₂H₄—)-phenyl |
| 36 | 2-methoxy-5-methyl-4-(HO₃SOH₄C₂O₂S)-phenyl | 4-methoxy-3-(SO₂C₂H₄—)-phenyl |

Examples 37 to 59

According to the synthetic methods of Examples 10 to 13, the compounds (37)-(59) can be obtained, as shown in Table 3.

TABLE 3

$$\left( \begin{array}{c} \text{A'}-\text{N}=\text{N} \\ \text{HO}_3\text{S} \end{array} \begin{array}{c} \text{OH} \quad \text{NH}_2 \\ \text{naphthalene core} \\ \text{SO}_3\text{H} \end{array} \begin{array}{c} \text{N}=\text{N}-\text{B}'-\text{O} \end{array} \right)_2$$

| Example/Formula | A' | (—N=N)—B'—(O—) |
|---|---|---|
| 37 | 2-methyl-5-($HO_3SOH_4C_2O_2S$)-phenyl with $SO_3H$ at 3-position | p-($SO_2C_2H_4$)-phenyl |
| 38 | 2-methyl-5-($HO_3SOH_4C_2O_2S$)-phenyl with $OCH_3$ at 3-position | p-($SO_2C_2H_4$)-phenyl |
| 39 | 3-methyl-4-($OCH_3$)-phenyl with $HO_3SOH_4C_2O_2S$ at other position | p-($SO_2C_2H_4$)-phenyl |
| 40 | 2-methyl-4-($OCH_3$)-5-($HO_3SOH_4C_2O_2S$)-phenyl with $H_3CO$ substituent | p-($SO_2C_2H_4$)-phenyl |
| 41 | 2-methyl-4-($OCH_3$)-5-($HO_3SOH_4C_2O_2S$)-phenyl with $H_3C$ substituent | p-($SO_2C_2H_4$)-phenyl |
| 42 | 4-($HO_3SOH_4C_2O_2S$)-phenyl | 2-methyl-5-($SO_2C_2H_4$)-phenyl with $SO_3H$ |
| 43 | 2-methyl-5-($HO_3SOH_4C_2O_2S$)-phenyl with $SO_3H$ | 2-methyl-5-($SO_2C_2H_4$)-phenyl with $SO_3H$ |

TABLE 3-continued
| Example/Formula | A' | (—N=N)—B'—(O—) |
|---|---|---|
| 44 | 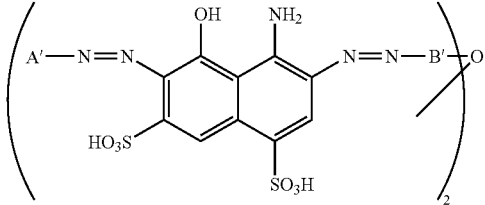 | 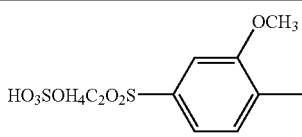 |
| 45 | 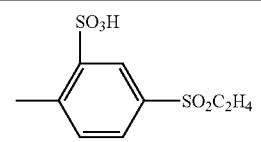 | 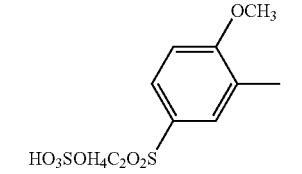 |
| 46 | 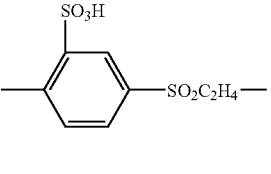 | 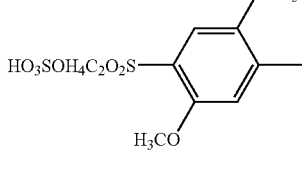 |
| 47 | 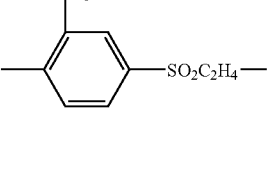 | 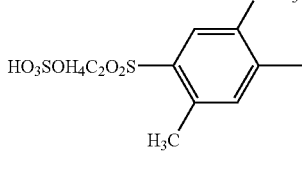 |
| 48 | 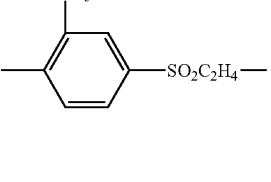 | 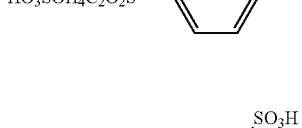 |
| 49 | 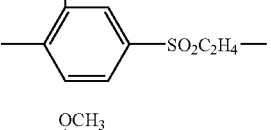 | 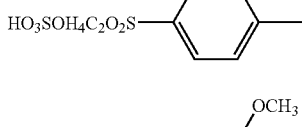 |
| 50 | 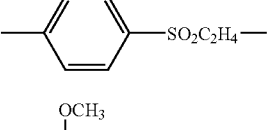 | 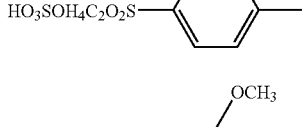 |
| 51 | 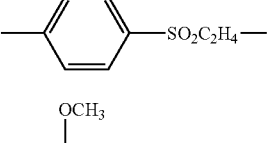 | 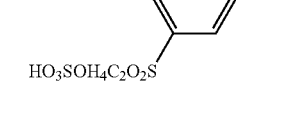 |

TABLE 3-continued
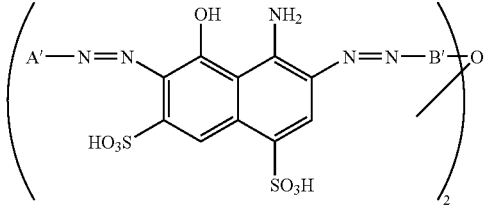
| Example/Formula | A' | (—N=N)—B'—(O—) |
|---|---|---|
| 52 | 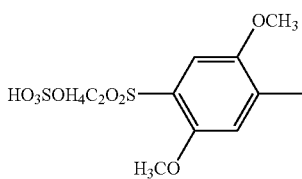 | 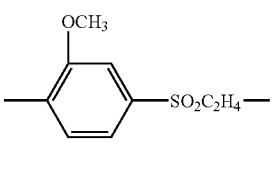 |
| 53 | 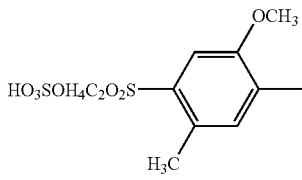 | 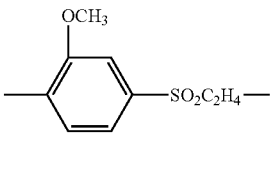 |
| 54 | 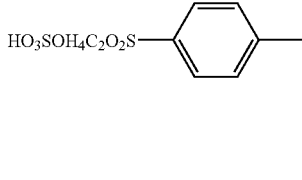 | 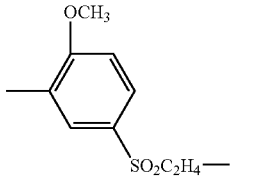 |
| 55 | 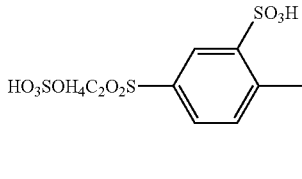 | 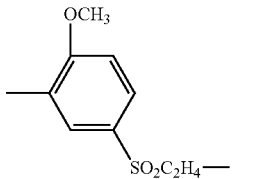 |
| 56 | 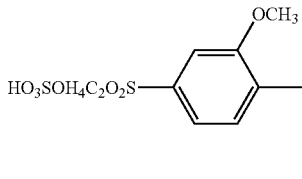 | 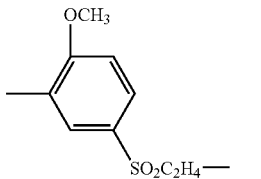 |
| 57 | 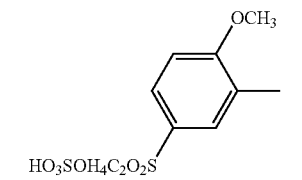 | 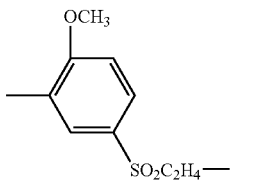 |

TABLE 3-continued
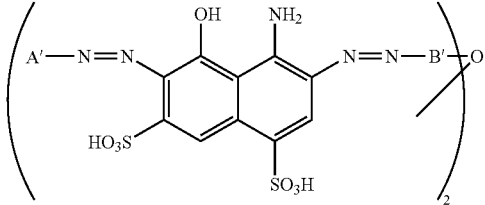
| Example/ Formula | A' | ( —N=N )—B'—(O—) |
|---|---|---|
| 58 | 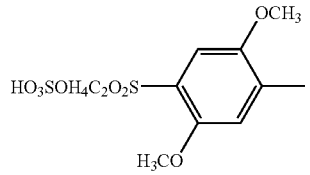 | 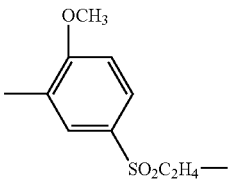 |
| 59 | 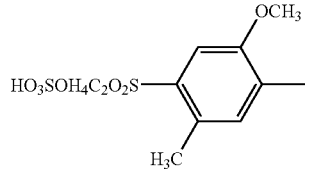 | 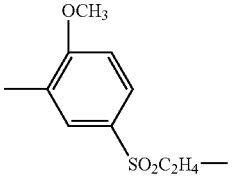 |
Examples 60 to 81
According to the synthetic methods of Examples 10 to 13, the compounds (60)-(81) can be obtained, as shown in Table 4.
TABLE 4
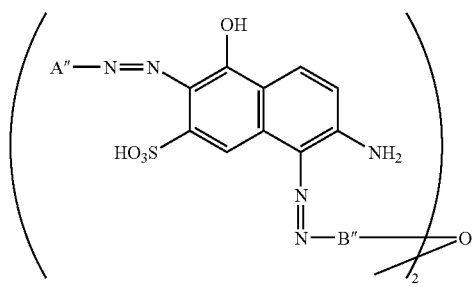
| Example/ Formula | A" | (—N=N)—B"—(O—) |
|---|---|---|
| 60 | 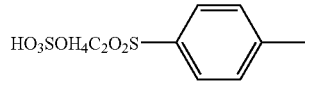 | 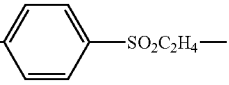 |
| 61 | 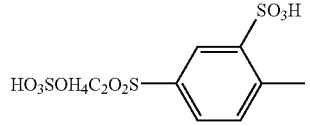 | 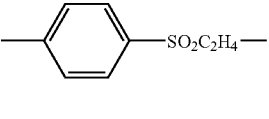 |

TABLE 4-continued

[Structure: bis-azo naphthol dye with substituents OH, NH₂, SO₃H, A''—N=N— and —N=N—B''—O— repeated twice]

| Example/Formula | A'' | (—N=N)—B''—(O—) |
|---|---|---|
| 62 | 3-methoxy-4-methyl-phenyl with HO₃SOH₄C₂O₂S- substituent | -C₆H₄-SO₂C₂H₄- |
| 63 | 4-methoxy-3-methyl-phenyl with HO₃SOH₄C₂O₂S- substituent | -C₆H₄-SO₂C₂H₄- |
| 64 | 2,5-dimethoxy-4-methyl-phenyl with HO₃SOH₄C₂O₂S- substituent | -C₆H₄-SO₂C₂H₄- |
| 65 | 2-methoxy-4,5-dimethyl-phenyl with HO₃SOH₄C₂O₂S- substituent | -C₆H₄-SO₂C₂H₄- |
| 66 | HO₃SOH₄C₂O₂S-C₆H₄- | 2-SO₃H, 4-SO₂C₂H₄-phenyl |
| 67 | 3-methoxy-4-methyl-phenyl with HO₃SOH₄C₂O₂S- substituent | 2-SO₃H, 4-SO₂C₂H₄-phenyl |
| 68 | 4-methoxy-3-methyl-phenyl with HO₃SOH₄C₂O₂S- substituent | 2-SO₃H, 4-SO₂C₂H₄-phenyl |

TABLE 4-continued
| Example/Formula | A'' | (—N=N)—B''—(O—) |
|---|---|---|
| 69 | 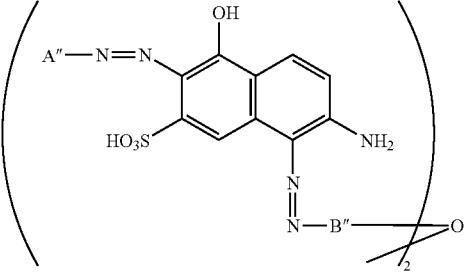 | 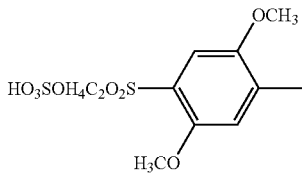 |
| 70 | 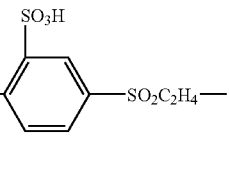 | 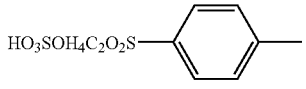 |
| 71 | 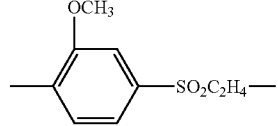 | 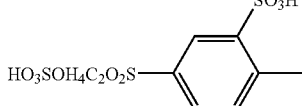 |
| 72 | 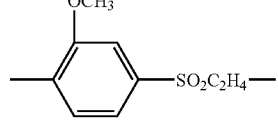 | 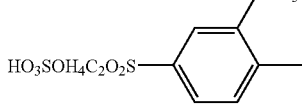 |
| 73 | 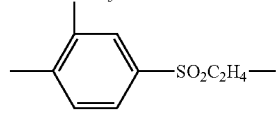 | 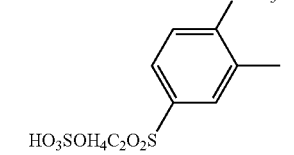 |
| 74 | 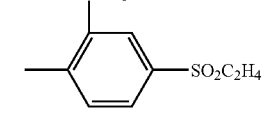 | 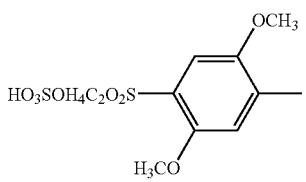 |
| 75 | 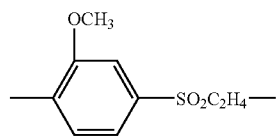 | 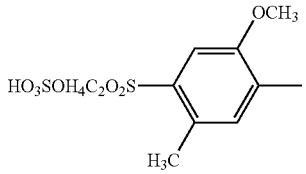 |

TABLE 4-continued
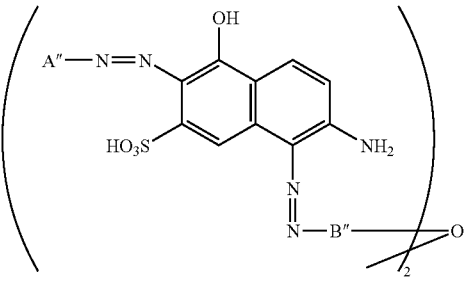
| Example/Formula | A″ | (—N=N)—B″—(O—) |
|---|---|---|
| 76 | HO₃SOH₄C₂O₂S—⟨C₆H₄⟩— | 2-OCH₃, 5-SO₂C₂H₄— phenyl |
| 77 | HO₃SOH₄C₂O₂S—⟨C₆H₃(SO₃H)⟩— (with CH₃) | 2-OCH₃, 5-SO₂C₂H₄— phenyl |
| 78 | HO₃SOH₄C₂O₂S—⟨C₆H₃(OCH₃)⟩— | 2-OCH₃, 5-SO₂C₂H₄— phenyl |
| 79 | HO₃SOH₄C₂O₂S—⟨C₆H₃(OCH₃)⟩— | 2-OCH₃, 5-SO₂C₂H₄— phenyl |
| 80 | HO₃SOH₄C₂O₂S—⟨C₆H₂(OCH₃)(OCH₃)⟩— | 2-OCH₃, 5-SO₂C₂H₄— phenyl |
| 81 | HO₃SOH₄C₂O₂S—⟨C₆H₂(OCH₃)(CH₃)⟩— | 2-OCH₃, 5-SO₂C₂H₄— phenyl |

Examples 82 to 89
According to the synthetic methods of Examples 10 to 13, the compounds (82)-(89) can be obtained, as shown in Table 5.
TABLE 5
Structure
(Example (or Formula)/Color Appearance)
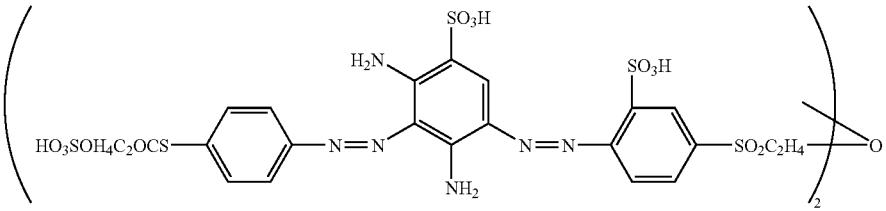
(82/ orange)
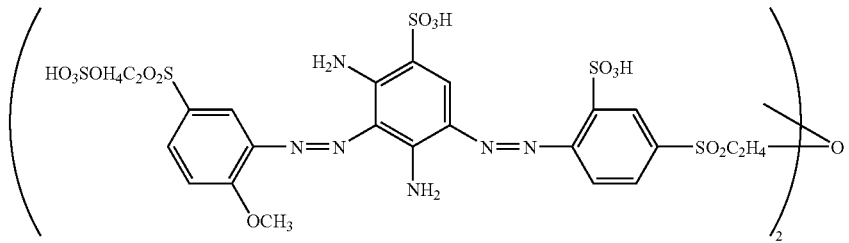
(83/ orange)
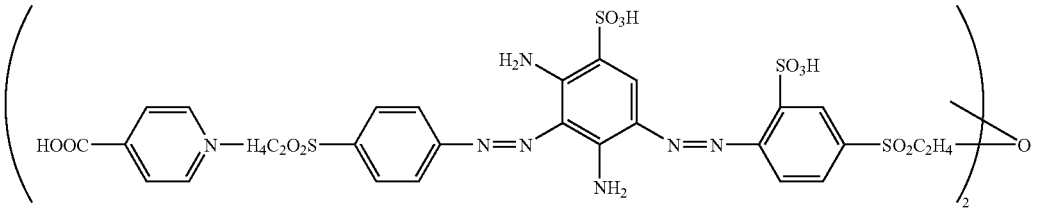
(84/ orange)
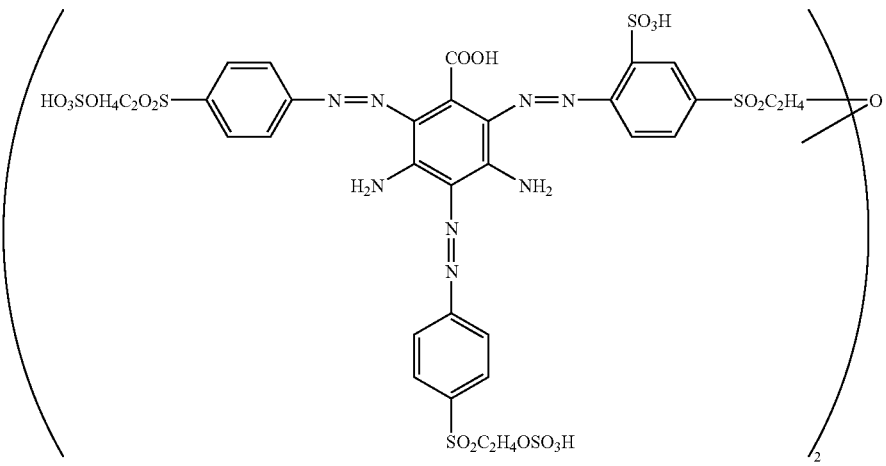
(85/ orange)

TABLE 5-continued
Structure
(Example (or Formula)/Color Appearance)
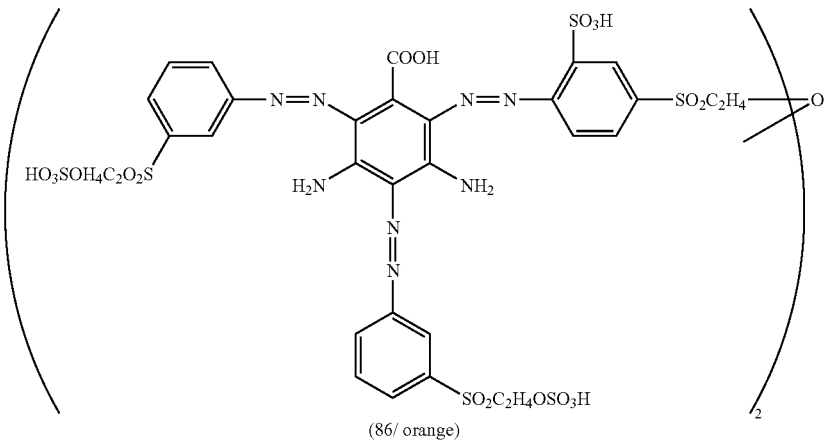
(86/ orange)
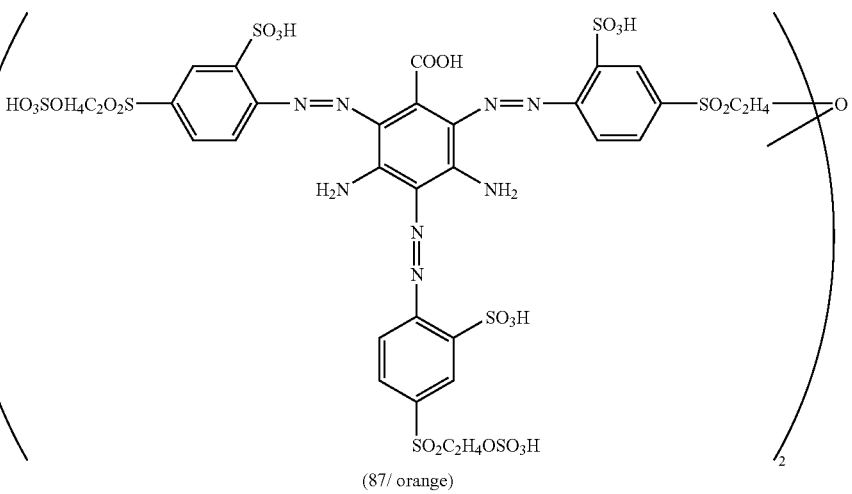
(87/ orange)
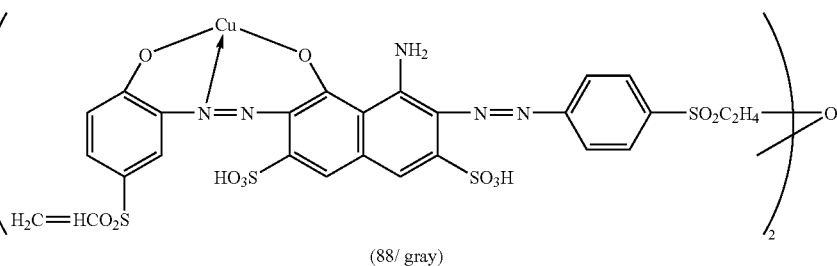
(88/ gray)
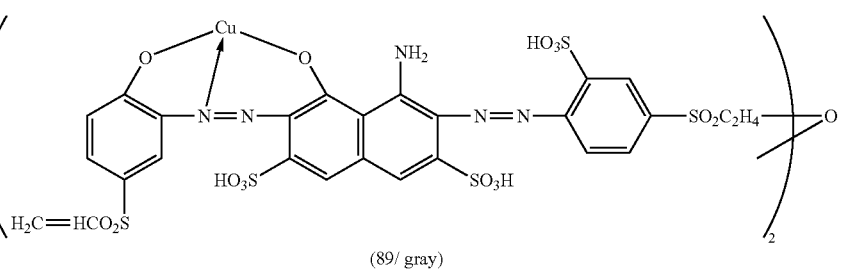
(89/ gray)

Example 90

3.66 parts of p-Aminophenyl-β-vinyl-sulphone are dispersed in 50 parts of water. Subsequently, the pH value of the solution is adjusted to 12 by the addition of 45% NaOH (aq) and the temperature thereof is controlled in a range of 55° C. to 60° C. to perform reaction for 3 hours. Finally, the product of formula (90) is obtained by acid precipitation, salting-out, filtration and purification.

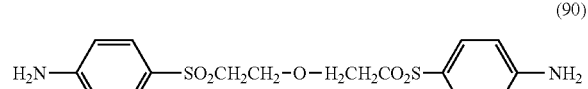
(90)

Examples 91 to 96

According to the synthetic method of Example 90, the bridge compounds (91)-(96) can be obtained, as shown in Table 6.

TABLE 6

| Example | Structure |
|---|---|
| 91 | 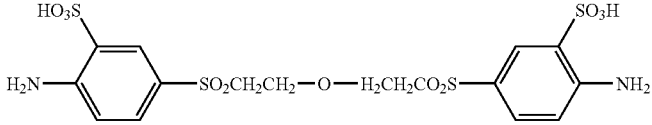 (91) |
| 92 | 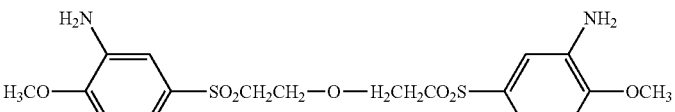 (92) |
| 93 | 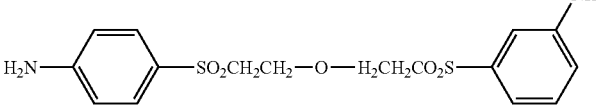 (93) |
| 94 | 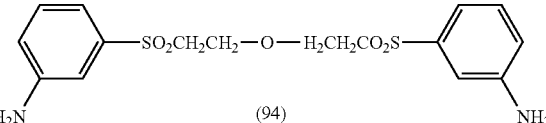 (94) |
| 95 | 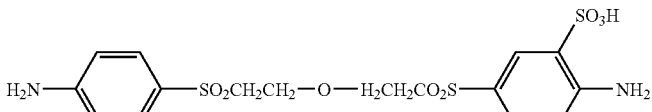 (95) |
| 96 | 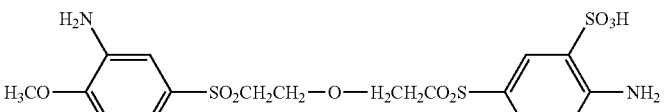 (96) |

Example 97

19.2 parts of the compound (90) are dispersed in 150 parts of ice water, followed by the addition of 35.4 parts of 32% HCl (aq) with thorough stirring. Then, 10.5 parts of sodium nitrite are added therein and the reaction solution is continuously stirred at a temperature in a range of 0° C. to 5° C. until the diazotization is accomplished to thereby afford a solution (A).

28.1 parts of 4-(β-sulfatoethylsulfone) aniline and 25.6 parts of 32% HCl (aq) are added into 300 parts of 0° C. water with thorough stirring to form a dispersion solution, followed by the addition of 7.2 parts of sodium nitrite. The temperature of the solution is controlled in a range of 0° C. to 5° C. until the diazotization is accomplished. Subsequently, 31.9 parts of 4-amino-5-hydroxy-2,7-naphthalenedisulfonic acid powder are added therein, and the pH value of the reaction solution is adjusted to 3 by the addition of 10 parts of NaHCO$_3$. The reaction solution is stirred until the coupling reaction is accomplished. Next, the solution (A) is added therein and the pH value of the reaction solution is adjusted to 5 by the addition of 21 parts of NaHCO$_3$. The reaction solution is stirred until the coupling reaction is accomplished. Finally, the navy product as shown in the following formula (97) is obtained by salting-out, filtration and drying.

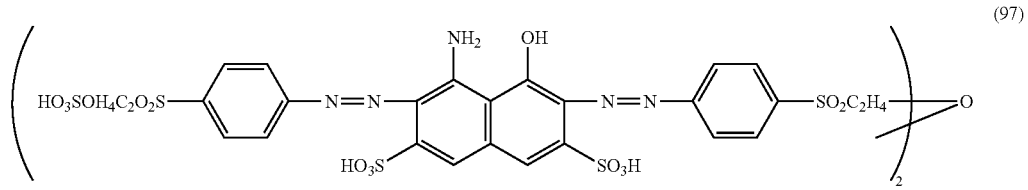

(97)

Example 98

28.1 parts of 4-(β-sulfatoethylsulfone) aniline and 25.6 parts of 32% HCl (aq) are added into 300 parts of 0° C. water with thorough stirring to form a dispersion solution, followed by the addition of 7.2 parts of sodium nitrite. The temperature of the solution is controlled in a range of 0° C. to 5° C. until the diazotization is accomplished. Subsequently, 31.9 parts of 4-amino-5-hydroxy-2,7-naphthalenedisulfonic acid powder are added therein, and the pH value of the reaction solution is adjusted in a range of 2 to 3 by the addition of 10 parts of NaHCO$_3$. The reaction solution is stirred until the coupling reaction is accomplished.

27.2 parts of the compound (91) are dispersed in 150 parts of ice water, followed by the addition of 25.6 parts of 32% HCl (aq) with thorough stirring. Then, 7.1 parts of sodium nitrite are added therein and the reaction solution is continuously stirred at a temperature in a range of 0° C. to 5° C. until the diazotization is accomplished. The above-mentioned reaction solution where the coupling reaction has been accomplished is added therein and the pH value is adjusted to 5 by the addition of 12 parts of NaHCO$_3$. The reaction solution is stirred until the coupling reaction is accomplished. Finally, the navy product as shown in the following formula (98) is obtained by salting-out, filtration and drying.

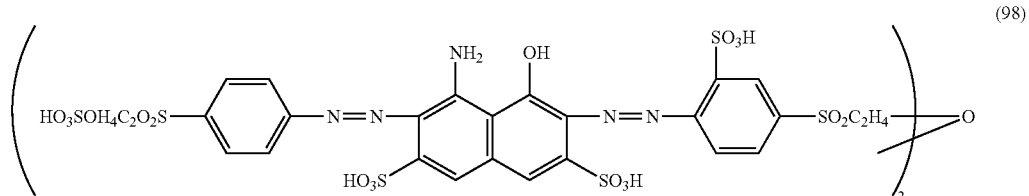

(98)

Example 99

36.1 parts of 1-aminobenzene-4-(β-sulfatoethyl sulfone)-2-sulfonic acid and 30 parts of 32% HCl (aq) are added into 150 parts of 0° C. water with thorough stirring, followed by the addition of 7.2 parts of sodium nitrite. The reaction solution is continuously stirred until the diazotization is accomplished. Subsequently, 18.8 parts of 2,4-diaminobenzene-1-sulfonic acid powders are added therein, and the pH value of the reaction solution is adjusted to 2 by the addition of 5 parts of NaHCO$_3$. The reaction solution is continuously stirred until the coupling reaction is accomplished to afford a yellow solution.

19.2 parts of the compound (90) are dispersed in 150 parts of ice water, followed by the addition of 25.6 parts of 32% HCl (aq) with thorough stirring. Then, 7.2 parts of sodium nitrite are added therein and the reaction solution is continuously stirred at a temperature in a range of 0° C. to 5° C. until the diazotization is accomplished. The above-mentioned yellow solution is added therein and the pH value is adjusted to 5 by the addition of 12 parts of NaHCO$_3$. The reaction solution is stirred until the coupling reaction is accomplished. Finally, the orange product as shown in the following formula (99) is obtained by salting-out, filtration and drying.

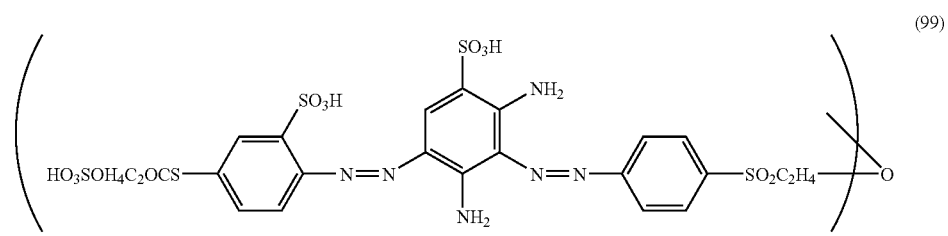

(99)

Examples 100 to 130

According to the synthetic methods of Examples 97-99, the reactive dyestuffs (100)-(130) with a dialkylether bridge group are obtained, as shown in Table 7.

TABLE 7

Structure
(Example (or Formula)/Color Appearance)

(100/ navy)

(101/ navy)

(102/ navy)

TABLE 7-continued
Structure
(Example (or Formula)/Color Appearance)
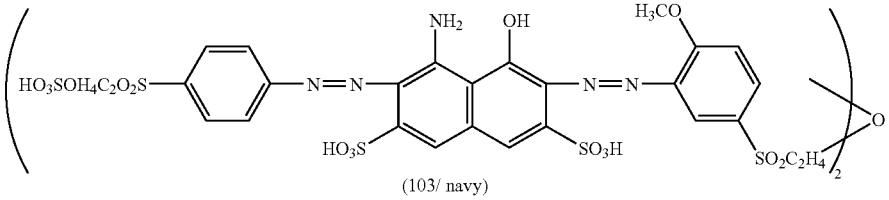
(103/ navy)
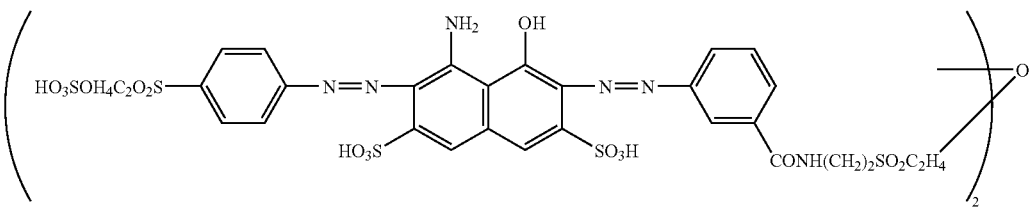
(104/ navy)
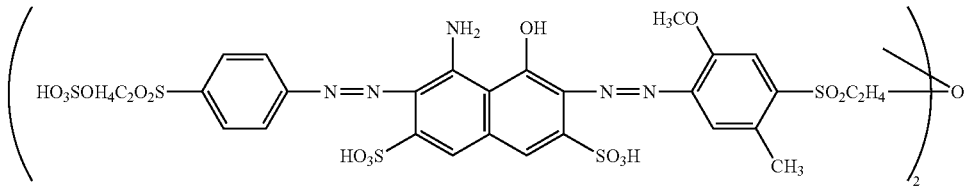
(105/ navy)
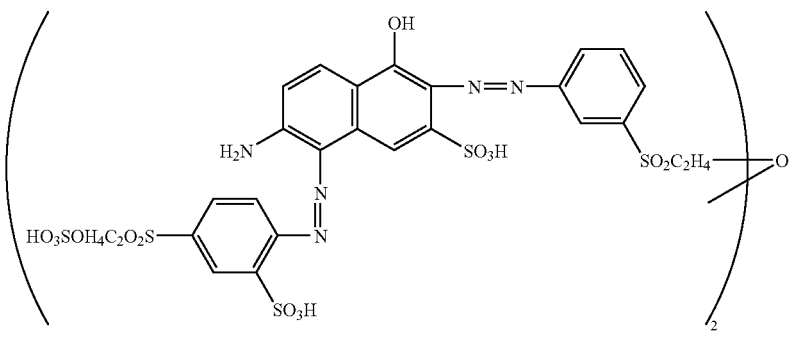
(106/ red)
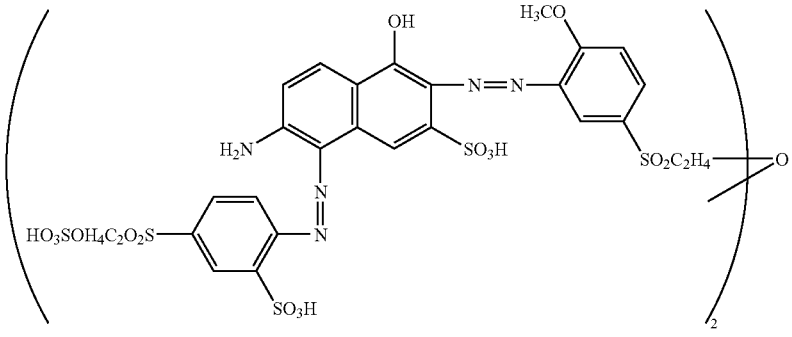
(107/ red)

TABLE 7-continued
Structure
(Example (or Formula)/Color Appearance)
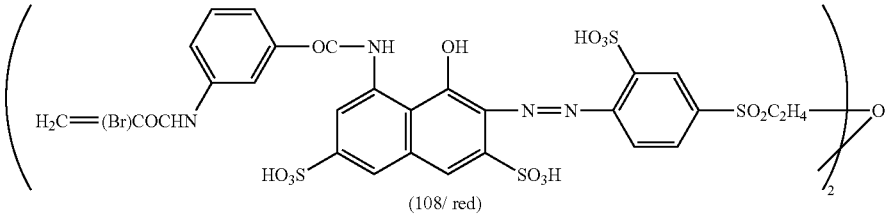
(108/ red)
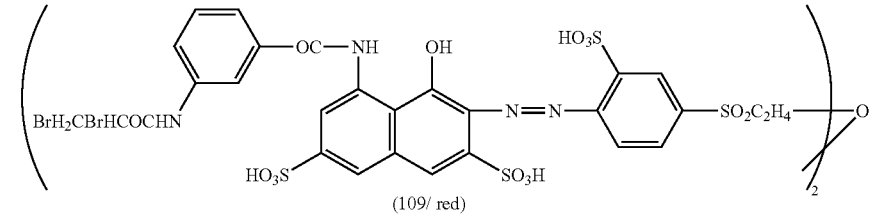
(109/ red)
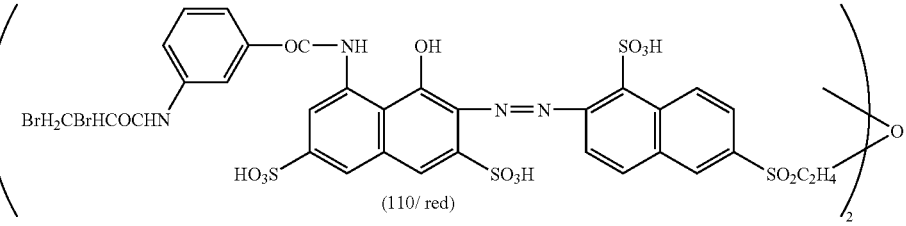
(110/ red)
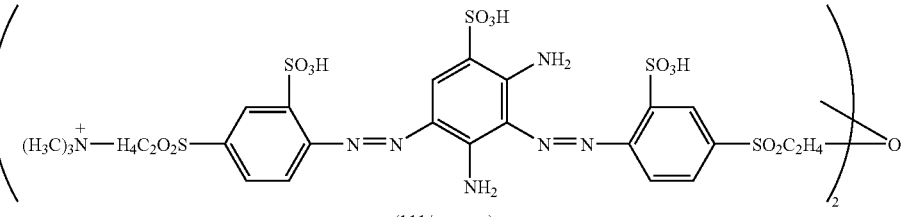
(111/ orange)
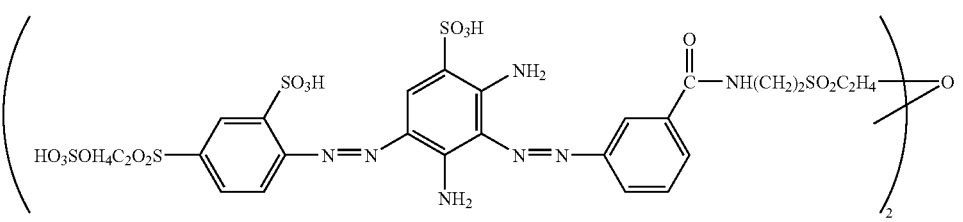
(112/ orange)
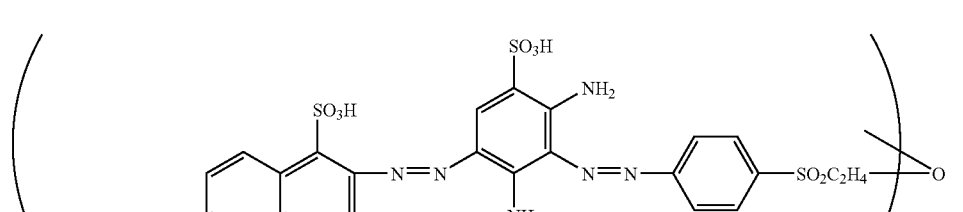
(113/ orange)

TABLE 7-continued
Structure
(Example (or Formula)/Color Appearance)
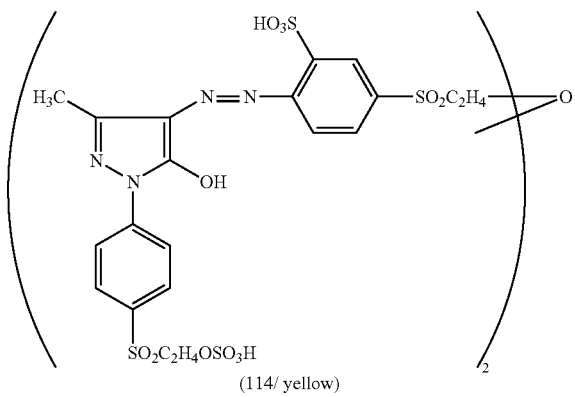
(114/ yellow)
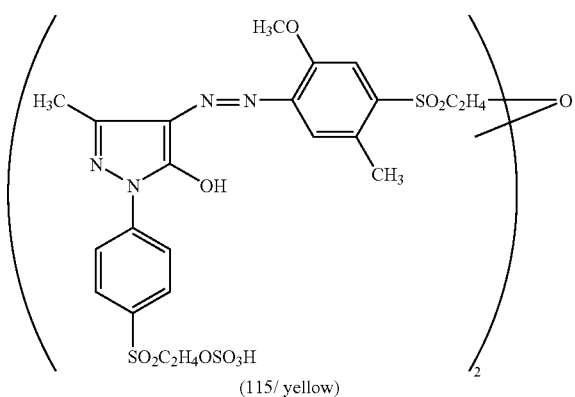
(115/ yellow)
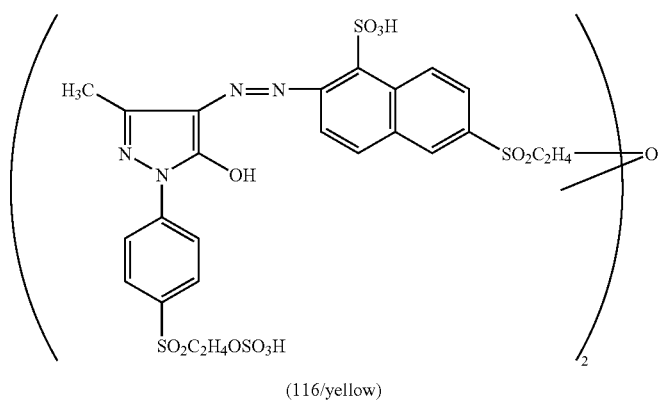
(116/yellow)

TABLE 7-continued
Structure
(Example (or Formula)/Color Appearance)
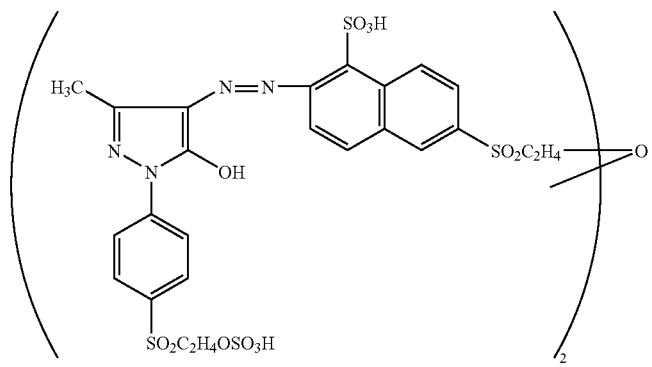
(117/ yellow)
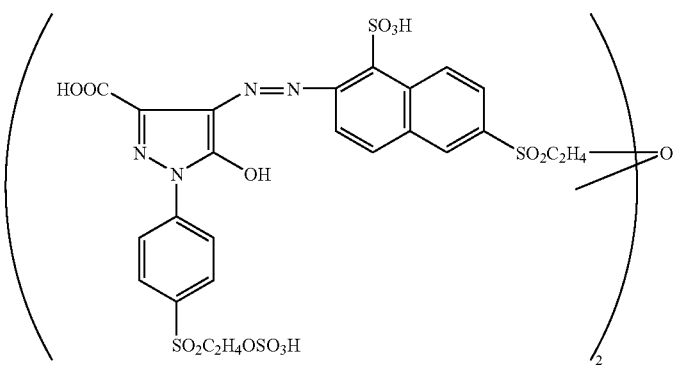
(118/ yellow)
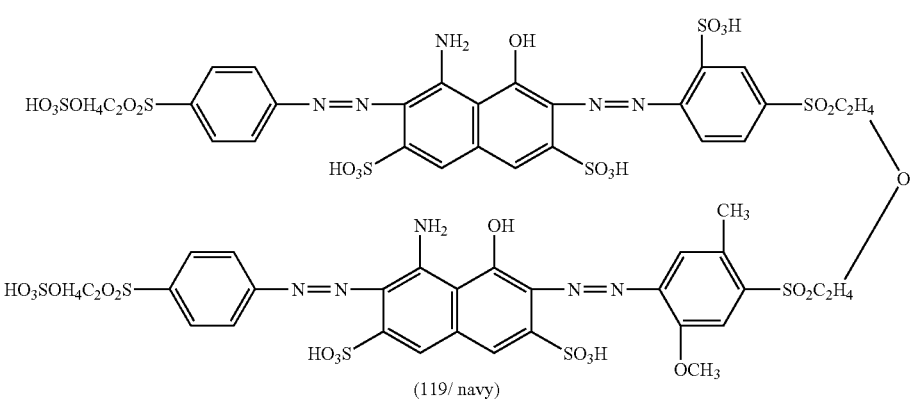
(119/ navy)

TABLE 7-continued

Structure
(Example (or Formula)/Color Appearance)

(120/ navy)

(121/ navy)

(122/ red)

TABLE 7-continued
Structure
(Example (or Formula)/Color Appearance)
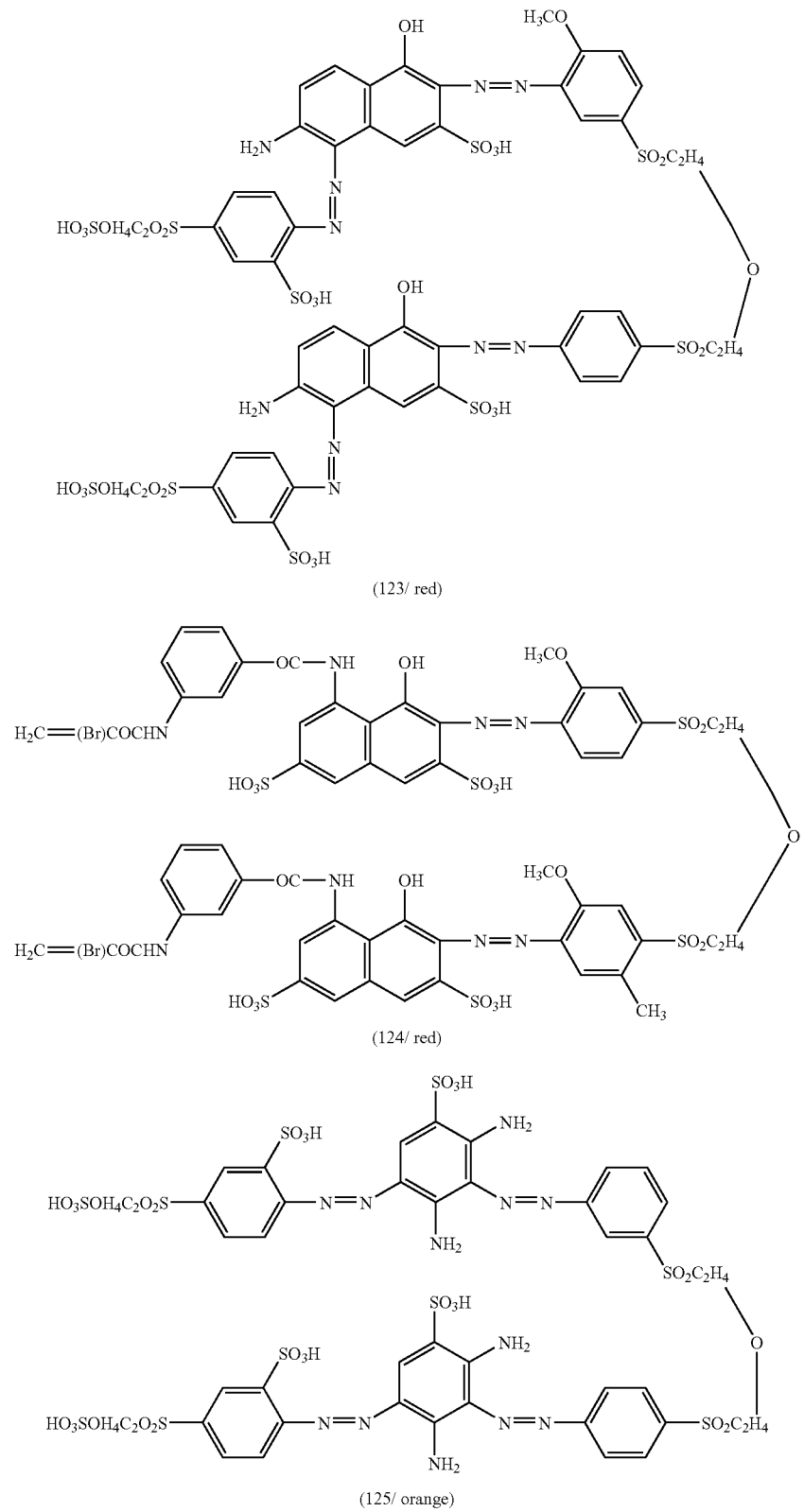
(123/ red)
(124/ red)
(125/ orange)

TABLE 7-continued

Structure
(Example (or Formula)/Color Appearance)

(126/ orange)

(127/ yellow)

(128/ navy)

TABLE 7-continued

Structure
(Example (or Formula)/Color Appearance)

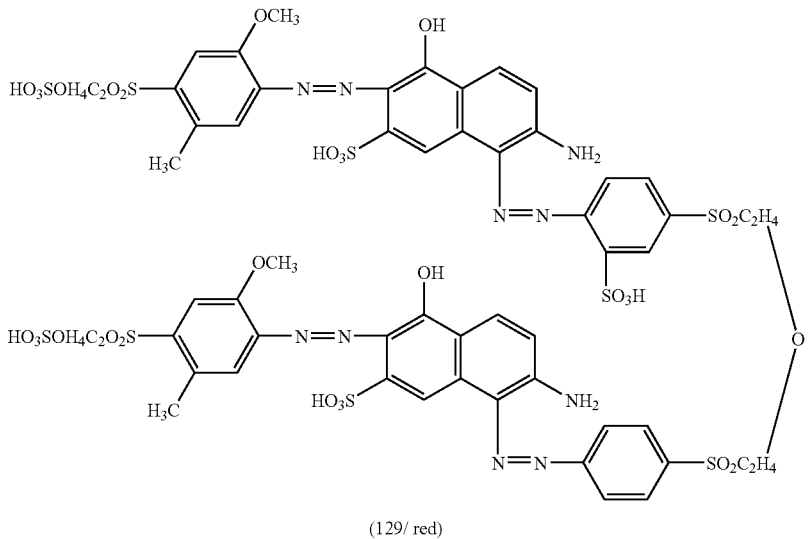

(129/ red)

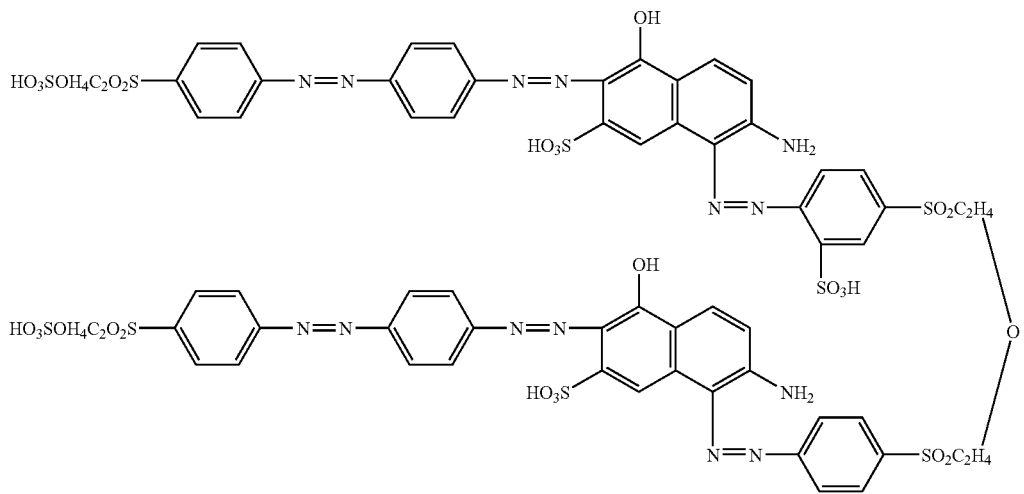

(130/ scarlet)

Testing Example 1

1 part of the dyestuff prepared in Example 10 is dissolved in 100 parts of distilled water to prepare a dye solution. 20 parts of the dye solution are poured into a dyeing vessel. Subsequently, 4.8 parts of Glauber's Salt are added into the dyeing vessel and then distilled water is added therein to make up the total amount of the dye solution to be 75 parts in total. After that, 5 parts of 320 g/l soda ash are added to the dyeing vessel. 4 parts of woven cotton fabric are put into the dye solution, followed by covering and locking the dyeing vessel, and the dyeing vessel is shaken to survey the dye. Then, the dyeing vessel is put into a thermostatic bath, followed by switching on the rotating knob. The temperature is raised to 60° C. in 30 minutes and then kept for 60 minutes. After dyeing is accomplished, the dyed fabric is taken out and washed with cold water. Finally, after washing, dehydration and drying, a navy fabric with good build up and good tinctorial yield is obtained.

Testing Example 2

3 parts of the dyestuff prepared in Example 10 are dissolved in 100 mL of water to obtain a 30 parts/l padding liquor. 25 ml of alkali solvent (taking 15 ml/l of NaOH and 30 parts/l of Glauber's salt) is added to the padding liquor and stirred thoroughly. The resultant solution is then put into a pad roller machine. The cotton fabric is padded by the roller pad machine, and batched for 4 hours under room temperature. The obtained navy fabric is orderly washed with cold water, boiling water for 10 minutes, boiling non-ionic detergent for 10 minutes, again with cold water and then dried to obtain a navy fabric with good build up and good tinctorial yield.

Testing Example 3

100 parts of Urea, 10 parts of m-nitrobenzene sulfonic acid sodium salt, 20 parts of sodium bicarbonate, 55 parts of sodium alginate, and 815 parts of lukewarm water (1000 parts in total) are stirred in a vessel to obtain a completely homogeneous printing paste.

3 parts of the dyestuff prepared in Example 10 are sprayed in 100 parts of the above printing paste and stirred to make a homogeneous colored paste. An adequate size piece of twilled cotton fabric is covered with a 100 mesh 45°-twilled printing screen and then painted with the colored paste on the printing screen to give a colored fabric.

This colored fabric is placed in an oven at 65° C. for 5 minutes until dry and then put into a steaming oven using saturated steam of 102-105° C. for 10 minutes.

The obtained navy fabric is orderly washed with cold water, boiling water for 10 minutes, boiling non-ionic detergent for 10 minutes, again with cold water and then dried to obtain a navy fabric with good build up and good tinctorial yield.

Test for Build Up

Exhaust dyeing is performed with the same optical density value (OD). The results are shown in Table 8.

<<Dyeing Condition>>

Temperature/Time: 60° C./60 min

Liquor Ratio: 1/20

Glauber's Salt: 60 g/L

Soda Ash: 20 g/L

TABLE 8

| | Concentration | |
|---|---|---|
| Apparent Strength | 1.0% | 3.0% |
| C.I. Reactive Black 5 | Comparison group | Comparison group |
| Example 10 | 129.4% | 119.4% |

In conventional dyeing art, the definition of apparent strength is based on the visible light absorption and reflection values of dyed samples at 300 nm-700 nm according to a spectral colorimeter, i.e. reflection ratio and K/S value. In general, the strength is represented by colour strength or apparent strength. The colour strength is K/S value at maximum absorption wavelength through 300 nm to 700 nm, and the apparent strength is the sum of K/S through 300 nm to 700 nm.

From the foregoing description, the novel dyestuff has improved substantivity, reactivity, fixation yield, build up and economical benefit. Accordingly, the technology according to the present invention achieves the objects of the invention and conforms to the patent requirements of novelty, inventive step and industrial applicability. Although the present invention has been explained in relation to its preferred examples, it is to be understood that many other possible modifications and variations can be made without departing from the scope of the invention as hereinafter claimed.

What is claimed is:

1. A reactive dyestuff with a dialkylether bridge group of the following formula (I),

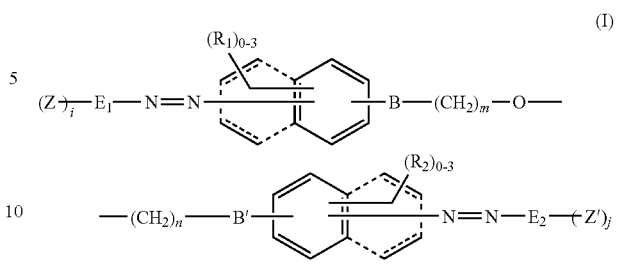

wherein, $E_1$ and $E_2$ each independently are couplers selected from the group consisting of benzene, naphthalene, pyrazolone, monoazo, disazo, polyazo and metal complex azo components;

$(R_1)_{0-3}$ and $(R_2)_{0-3}$ each independently are 0 to 3 identical or different groups, and each of $R_1$ and $R_2$ independently is selected from the group consisting of hydrogen, halogen, hydroxyl, carboxyl, sulfo, nitro, cyano, $C_{1-4}$ alkyl, $C_{1-4}$ alkoxy, ureido and amido;

B and B' each independently are selected from the group consisting of a direct bond, $-SO_2-$ and $-CONH-(CH_2)_k-SO_2-$;

k is an integer between 1 to 6;

Z and Z' each independently are selected from the group consisting of $-SO_2-U$, $-CONH-(CH_2)_d-SO_2-U$, $-O-(CH_2)_r-CONH-(CH_2)_d-SO_2-U$, β-thiosulfatoethylsulfonyl and $-N(R')-U'$;

d and r are integers independent of one another between 2 to 4;

U is $-OH$, $-CH_2CH_2OH$, $-CH_2CH_2W$ or $-CH=CH_2$;

W is a leaving group, $-Cl$, $-OSO_3H$ or $-OPO_3H$, which is eliminable by a base, a qualter salt selected from the group consisting of quaternary ammonium, pyridine, carboxypyridinium, methylpyridinium and carbonamidopyridinium, or a group of

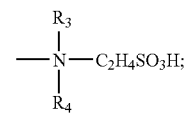

$R_3$ and $R_4$ each independently are hydrogen or $C_{1-4}$ alkyl;

U' is α,β-halopropionyl, α-haloacryloyl, β-halopropionyl or α-haloacryloyl;

R' is hydrogen or $C_{1-4}$ alkyl;

i and j are integers independent of one another between 0 to 2, and the sum of i and j is not 0; and m and n are integers independent of one another between 1 to 4.

2. The reactive dyestuff with a dialkylether bridge group as claimed in claim 1, wherein $(R_1)_{0-3}$ and $(R_2)_{0-3}$ each independently are 0 to 3 identical or different groups, and each of $R_1$ and $R_2$ independently is selected from the group consisting of hydrogen, sulfo, $C_{1-4}$ alkyl and $C_{1-4}$ alkoxy.

3. The reactive dyestuff with a dialkylether bridge group as claimed in claim 1, wherein B and B' each independently are $-SO_2-$ or $-CONH-(CH_2)_k-SO_2-$.

4. The reactive dyestuff with a dialkylether bridge group as claimed in claim 1, wherein Z and Z' each independently are selected from the group consisting of $-SO_2-U$, $-CONH-(CH_2)_d-SO_2-U$ and $-N(R')-U'$.

5. The reactive dyestuff with a dialkylether bridge group as claimed in claim 1, wherein $E_1$ and $E_2$ each independently are a pyrazolone component of the following formula,

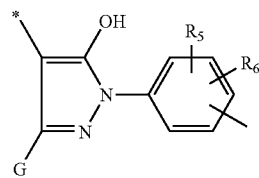
(I-1)

wherein, G is $C_{1-3}$ alkyl, carboxyl or $C_{2-5}$ alkylcarboxyl; and $R_5$ and $R_6$ each independently are selected from the group consisting of hydrogen, halogen, hydroxyl, carboxyl, sulfa, nitro, cyano, $C_{1-4}$ alkyl and $C_{1-4}$ alkoxy.

6. The reactive dyestuff with a dialkylether bridge group as claimed in claim 1, wherein $E_1$ and $E_2$ each independently are a benzene component of the following formula,

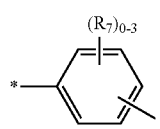
(I-2)

wherein, $(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

7. The reactive dyestuff with a dialkylether bridge group as claimed in claim 1, wherein $E_1$ and $E_2$ each independently are a naphthalene component selected from the group consisting of

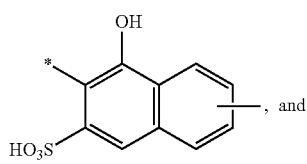
(I-3)

and

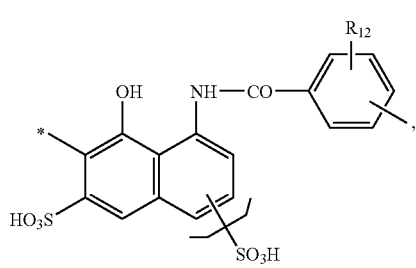
(I-4)

wherein, $R_{12}$ is selected from the group consisting of hydrogen, halogen, hydroxyl, carboxyl, sulfo, amino, nitro, cyano, acetylamino, ureido, $C_{1-4}$ alkyl and $C_{1-4}$ alkoxy.

8. The reactive dyestuff with a dialkylether bridge group as claimed in claim 1, wherein $E_1$ and $E_2$ each independently are a monoazo component selected from the group consisting of

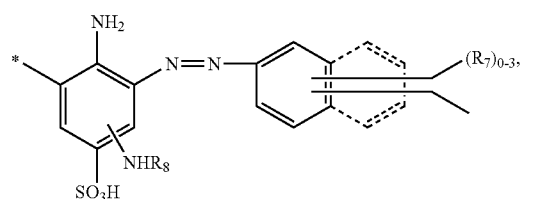
(I-5)

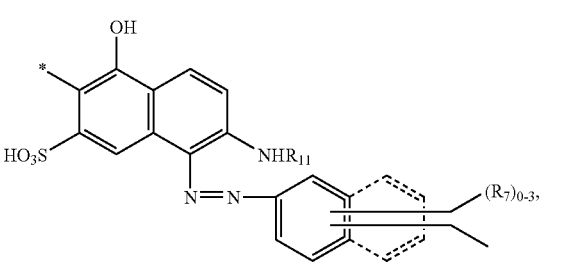
(I-6)

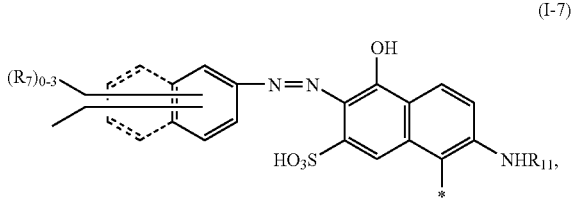
(I-7)

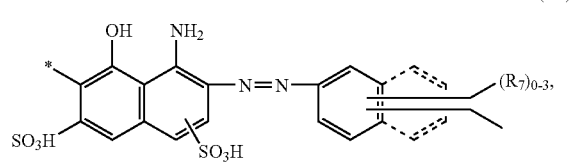
(I-8)

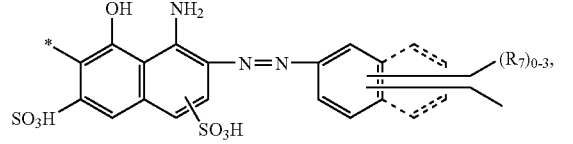
(I-9)

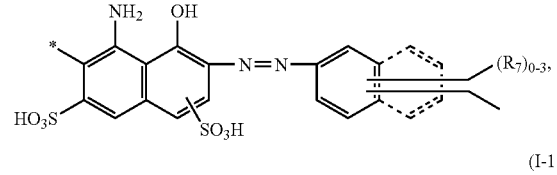
(I-10)

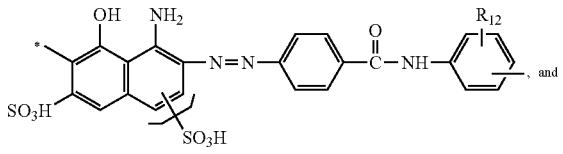
(I-11)

wherein, $(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$R_8$ is hydrogen, $C_{1-4}$ alkyl, $C_{2-4}$ alkylcarboxyl or $C_{1-4}$ alkyl substituted by hydroxyl, cyano, carboxyl, sulfa, methoxycarbonyl, ethoxycarbonyl or acetoxy;

$R_{11}$ is hydrogen, $C_{1-4}$ alkyl, unsubstituted or substituted phenyl by halogen, hydroxyl, carboxyl, sulfo, nitro, $C_{1-4}$ alkyl or $C_{1-4}$ alkoxy, or $C_{1-4}$ alkyl substituted by hydroxyl, carboxyl, cyano or sulfo; and $R_{12}$ is selected from the group consisting of hydrogen, halogen, hydroxyl, carboxyl, sulfo, amino, nitro, cyano, acetylamino, ureido, alkyl and $C_{1-4}$ alkoxy.

9. The reactive dyestuff with a dialkylether bridge group as claimed in claim 1, wherein $E_1$ and $E_2$ each independently are a disazo component selected from the group consisting of

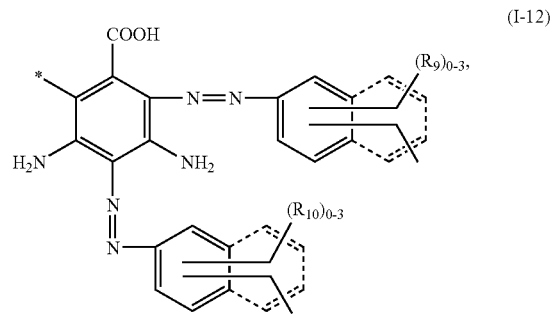

$(R_9)_{0-3}$ is 0 to 3 identical or different groups, and each of $R_9$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$(R_{10})_{0-3}$ is 0 to 3 identical or different groups, and each of $R_{10}$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$R_{11}$ is hydrogen, $C_{1-4}$ alkyl, unsubstituted or substituted phenyl by halogen, hydroxyl, carboxyl, sulfo, nitro, $C_{1-4}$ alkyl or $C_{1-4}$ alkoxy, or $C_{1-4}$ alkyl substituted by hydroxyl, carboxyl, cyano or sulfo;

$R_{12}$ is selected from the group consisting of hydrogen, halogen, hydroxyl, carboxyl, sulfo, amino, nitro, cyano, acetylamino, ureido, $C_{1-4}$ alkyl and $C_{1-4}$ alkoxy; and

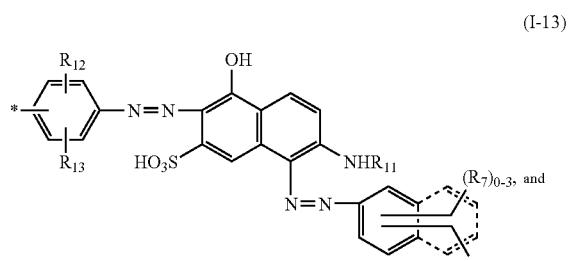

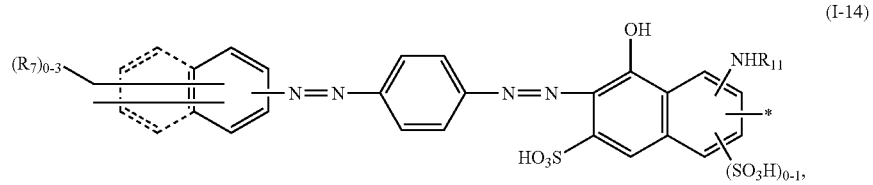

wherein, $(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$R_{13}$ is selected from the group consisting if hydrogen, halogen, hydroxyl, carboxyl, sulfa, amino, nitro, cyano, acetylamino, uredio, $C_{1-4}$ alkyl and $C_{1-4}$ alkoxy.

10. The reactive dyestuff with a dialkylether bridge group as claimed in claim 1, wherein $E_1$ and $E_2$ each independently are a polyazo component of the following formula,

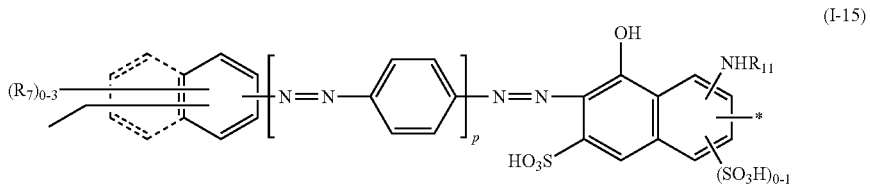
(I-15)

wherein, $(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$R_{11}$ is hydrogen, $C_{1-4}$ alkyl, unsubstituted or substituted phenyl by halogen, hydroxyl, carboxyl, sulfo, nitro, $C_{1-4}$ alkyl or $C_{1-4}$ alkoxy, or $C_{1-4}$ alkyl substituted by hydroxyl, carboxyl, cyano or sulfo; and p is 2 or 3.

11. The reactive dyestuff with a dialkylether bridge group as claimed in claim 1, wherein $E_1$ and E each independently are a polyazo component selected form the group consisting of

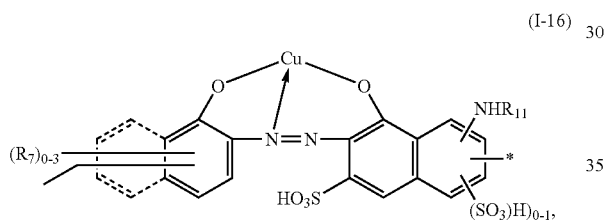
(I-16)

and

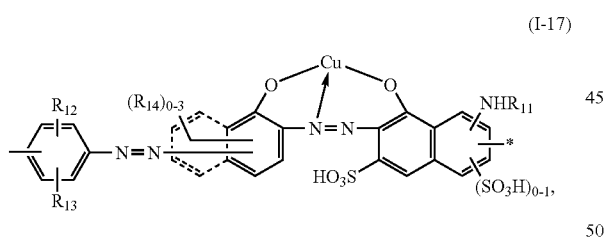
(I-17)

wherein, $(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$R_{11}$ is hydrogen, $C_{1-4}$ alkyl, unsubstituted or substituted phenyl by halogen, hydroxyl, carboxyl, sulfo, nitro, $C_{1-4}$ alkyl or $C_{1-4}$ alkoxy, or $C_{1-4}$ alkyl substituted by hydroxyl, carboxyl, cyano or sulfo;

$R_{12}$ is selected from the group consisting of hydrogen, halogen, hydroxyl, carboxyl, sulfo, amino, nitro, cyano, acetylamino, ureido, $C_{1-4}$ alkyl and $C_{1-4}$ alkoxy;

$R_{13}$ is selected from the group consisting of hydrogen, halogen, hydroxyl, carboxyl, sulfo, amino, nitro, cyano, acetylamino, uredio, $C_{1-4}$ alkyl and $C_{1-4}$ alkoxy; and $(R_{14})_{0-3}$ is 0 to 3 identical or different groups, and each of $R_{14}$ independently is selected from the group consisting of halogen, hydroxyl, carboxyl, sulfo, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

12. The reactive dyestuff with a dialkylether bridge group as claimed in claim 1, wherein $E_1$ and $E_2$ each independently are a pyrazolone component of the following formula,

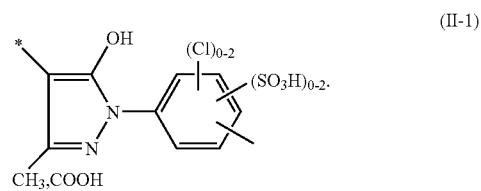
(II-1)

13. The reactive dyestuff with a dialkylether bridge group as claimed in claim 1, wherein $E_1$ and $E_2$ each independently are a naphthalene component of the following formula,

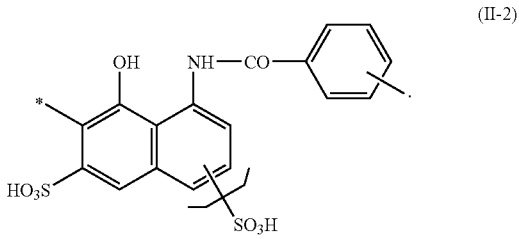
(II-2)

14. The reactive dyestuff with a dialkylether bridge group as claimed in claim 1, wherein $E_1$ and $E_2$ each independently are a monoazo component selected from the group consisting of

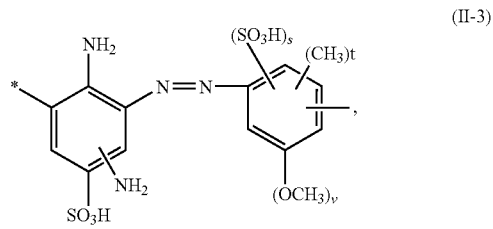
(II-3)

-continued

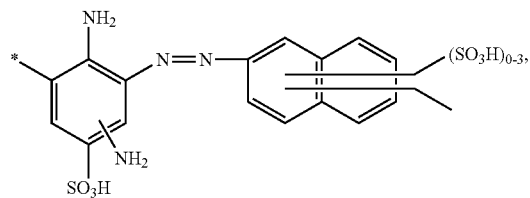
(II-4)

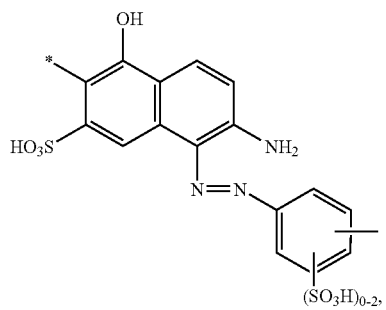
(II-5)

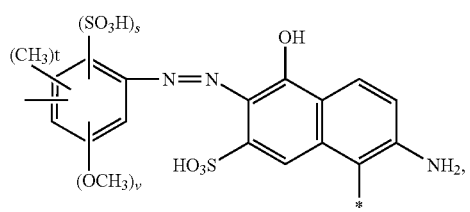
(II-6)

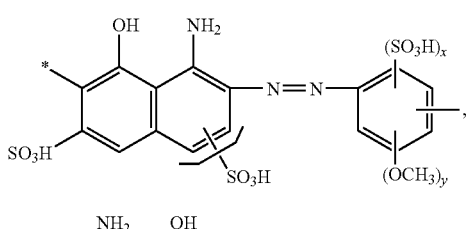
(II-7)

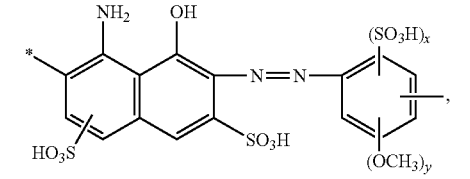
(II-8)

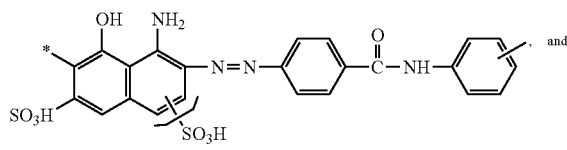
(II-9) and

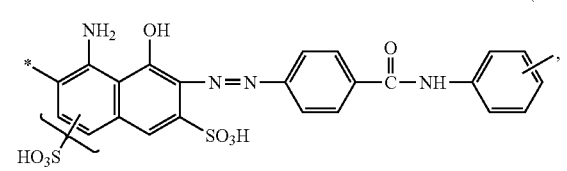
(II-10)

wherein, s, t and v are integers independent of one another between 0 to 2, and s+t+v is an integer between 0 to 3; and x and y are integers independent of one another between 0 to 2, and x+y is an integer between 0 to 3.

15. The reactive dyestuff with a dialkylether bridge group as claimed in claim 1, wherein $E_1$ and $E_2$ each independently are a disazo component selected from the group consisting of

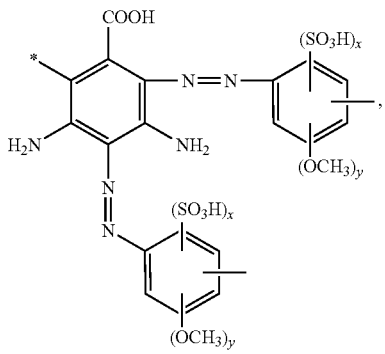
(II-11)

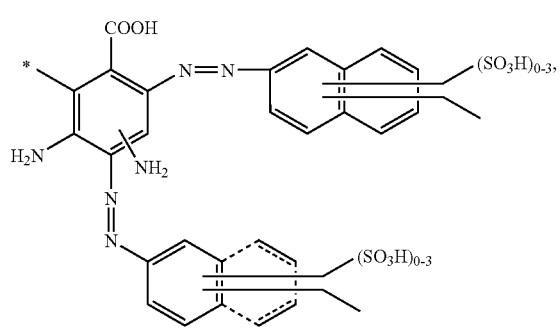
(II-12)

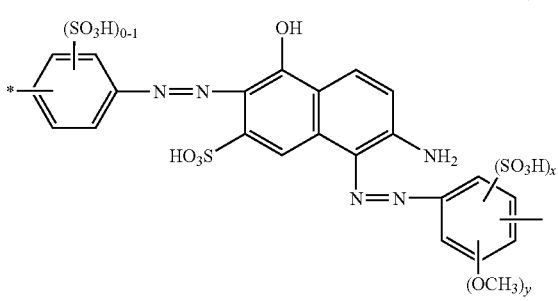
(II-13)

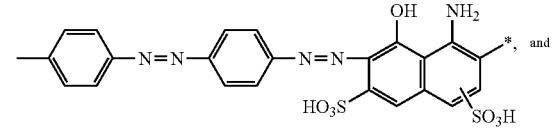
(II-14) and

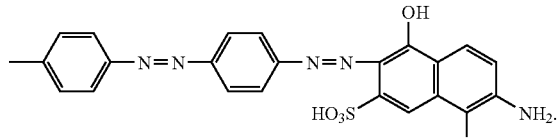
(II-15)

16. The reactive dyestuff with a dialkylether bridge group as claimed in claim 1, wherein $E_1$ and $E_2$ each independently are a metal complex azo component of the following formula,

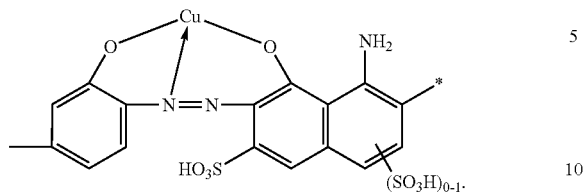
(II-16)

17. The reactive dyestuff with a dialkylether bridge group as claimed in claim 1, wherein the reactive dyestuff of the formula (1) is a compound of the following formula (97),

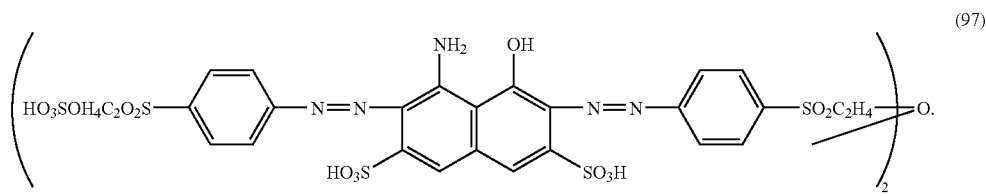
(97)

18. The reactive dyestuff with a dialkylether bridge group as claimed in claim 1, wherein the reactive dyestuff of the formula (1) is a compound of the following formula (12),

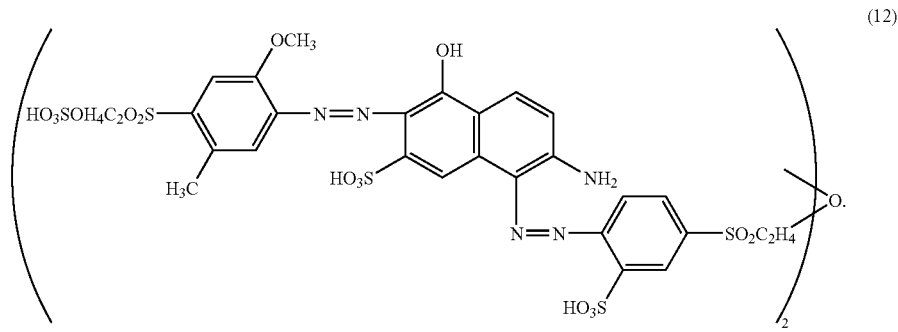
(12)

19. The reactive dyestuff with a dialkylether bridge group as claimed in claim 1, wherein the reactive dyestuff of the formula (1) is a compound of the following formula (99),

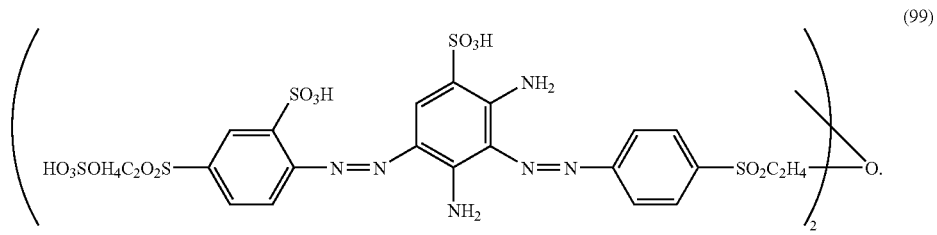
(99)

20. The reactive dyestuff with a dialkylether bridge group as claimed in claim 1, wherein the reactive dyestuff of the formula (1) is a compound of the following formula (85),

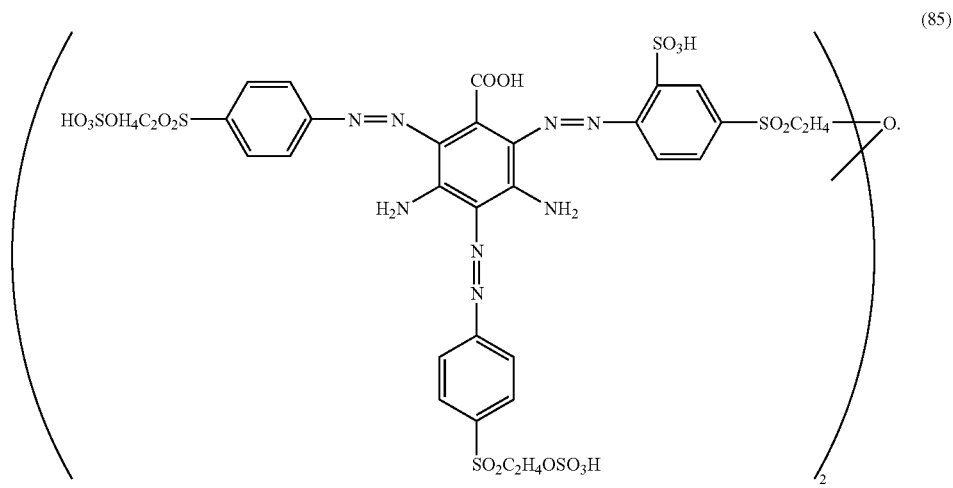
* * * * *